US010139095B2

(12) United States Patent
Yoder et al.

(10) Patent No.: US 10,139,095 B2
(45) Date of Patent: Nov. 27, 2018

(54) REFLECTOR AND LAMP COMPRISED THEREOF

(71) Applicant: GE LIGHTING SOLUTIONS, LLC, East Cleveland, OH (US)

(72) Inventors: Benjamin Lee Yoder, Cleveland Heights, OH (US); William Stewart Johnson, Cleveland, OH (US); Roderick Fitzgerald Rebman, Mansfield, OH (US); Glenn Howard Kuenzler, Beachwood, OH (US); Mark J. Mayer, Sagamore Hills, OH (US); Jeyachandrabose Chinniah, Katy, TX (US)

(73) Assignee: GE Lighting Solutions, LLC, East Cleveland, OH (US)

( * ) Notice: Subject to any disclaimer, the term of this patent is extended or adjusted under 35 U.S.C. 154(b) by 501 days.

(21) Appl. No.: 14/536,957

(22) Filed: Nov. 10, 2014

(65) Prior Publication Data
US 2016/0131333 A1   May 12, 2016

(51) Int. Cl.
*F21V 7/04*     (2006.01)
*F21V 29/60*    (2015.01)
(Continued)

(52) U.S. Cl.
CPC .............. *F21V 29/60* (2015.01); *F21K 9/23* (2016.08); *F21K 9/232* (2016.08); *F21K 9/60* (2016.08);
(Continued)

(58) Field of Classification Search
CPC ........ F21V 29/67; F21V 29/60; F21V 29/507; F21V 29/70; F21V 29/74; F21V 29/75;
(Continued)

(56) References Cited

U.S. PATENT DOCUMENTS 1,500,912 A   7/1924  Williams
1,811,782 A   6/1931  Duncan, Jr.
(Continued)

FOREIGN PATENT DOCUMENTS

CA   2496937 A1   3/2004
CA   2515647 A1   9/2004
(Continued)

OTHER PUBLICATIONS

U.S. Non-Final Office Action issued in connection with related U.S. Appl. No. 14/398,944 dated Jul. 13, 2016.
(Continued)

*Primary Examiner* — Anabel Ton
(74) *Attorney, Agent, or Firm* — Peter T. DiMauro; GPO Global Patent Operations

(57) ABSTRACT

Embodiments of a lamp that utilizes a reflector and a light source with light-emitting diode (LED) devices to generate an optical intensity distribution substantially similar to that of a conventional incandescent light bulb. These embodiments utilize an operation configuration with parameters that define relationships between components of the lamp to generate the optical intensity distribution. These parameters can, in one example, set out the position of the reflector relative to the light source as well as the ratio between dimensions of the reflector and the light source. In one embodiment, the reflector is in position relative to the light source to form a blocking area proximate the light source that defines a part of the lamp that does not diffuse light.

11 Claims, 12 Drawing Sheets

(51) Int. Cl.

| | | |
|---|---|---|
| *F21V 29/74* | (2015.01) | |
| *F21V 29/507* | (2015.01) | |
| *F21V 5/02* | (2006.01) | |
| *F21V 7/00* | (2006.01) | |
| *F21V 13/02* | (2006.01) | |
| *F21V 29/63* | (2015.01) | |
| *F21V 29/75* | (2015.01) | |
| *F21V 29/83* | (2015.01) | |
| *G02B 27/09* | (2006.01) | |
| *F21V 29/67* | (2015.01) | |
| *F21V 29/70* | (2015.01) | |
| *F21K 9/23* | (2016.01) | |
| *F21K 9/232* | (2016.01) | |
| *F21K 9/60* | (2016.01) | |
| *F21V 29/02* | (2006.01) | |
| *F21V 3/02* | (2006.01) | |
| *F21V 7/22* | (2018.01) | |
| *F21V 23/00* | (2015.01) | |
| *F21V 29/77* | (2015.01) | |
| *F21Y 101/00* | (2016.01) | |
| *F21Y 105/00* | (2016.01) | |
| *F21Y 105/10* | (2016.01) | |
| *F21Y 115/10* | (2016.01) | |
| *F21Y 115/15* | (2016.01) | |
| *F21Y 113/13* | (2016.01) | |
| *F21K 9/238* | (2016.01) | |
| *F21V 29/87* | (2015.01) | |

(52) U.S. Cl.
CPC .............. *F21V 5/02* (2013.01); *F21V 7/0091* (2013.01); *F21V 7/041* (2013.01); *F21V 7/048* (2013.01); *F21V 13/02* (2013.01); *F21V 29/507* (2015.01); *F21V 29/63* (2015.01); *F21V 29/67* (2015.01); *F21V 29/70* (2015.01); *F21V 29/74* (2015.01); *F21V 29/75* (2015.01); *F21V 29/83* (2015.01); *G02B 27/0972* (2013.01); *F21K 9/238* (2016.08); *F21V 3/02* (2013.01); *F21V 7/22* (2013.01); *F21V 23/006* (2013.01); *F21V 23/009* (2013.01); *F21V 29/02* (2013.01); *F21V 29/773* (2015.01); *F21V 29/87* (2015.01); *F21Y 2101/00* (2013.01); *F21Y 2105/00* (2013.01); *F21Y 2105/10* (2016.08); *F21Y 2113/13* (2016.08); *F21Y 2115/10* (2016.08); *F21Y 2115/15* (2016.08); *Y02B 20/30* (2013.01)

(58) Field of Classification Search
CPC . F21V 29/83; F21K 9/23; F21K 9/232; F21K 9/60
See application file for complete search history.

(56) References Cited

U.S. PATENT DOCUMENTS

| | | |
|---|---|---|
| 3,180,981 A | 4/1965 | Ulffers |
| 3,341,689 A | 9/1967 | Reichenbach |
| 4,042,522 A | 8/1977 | Falk |
| 4,107,238 A | 8/1978 | Roper et al. |
| 4,141,941 A | 2/1979 | Travnicek |
| 4,211,955 A | 7/1980 | Ray |
| 4,320,268 A | 3/1982 | Brown |
| 4,337,506 A | 6/1982 | Terada |
| 4,388,678 A | 6/1983 | Turner |
| 4,562,018 A | 12/1985 | Neefe |
| 4,727,289 A | 2/1988 | Uchida |
| 4,803,394 A | 2/1989 | Holten |
| 4,826,424 A | 5/1989 | Arai et al. |
| 4,918,497 A | 4/1990 | Edmond |
| 4,933,822 A | 6/1990 | Nakamats |
| 4,966,862 A | 10/1990 | Edmond |
| 4,972,308 A | 11/1990 | Chen |
| 4,988,911 A | 1/1991 | Miller |
| 4,992,704 A | 2/1991 | Stinson |
| 5,027,168 A | 6/1991 | Edmond |
| 5,087,949 A | 2/1992 | Haitz |
| 5,093,576 A | 3/1992 | Edmond et al. |
| 5,110,278 A | 5/1992 | Tait et al. |
| 5,134,550 A | 7/1992 | Young |
| 5,140,220 A | 8/1992 | Hasegawa |
| 5,143,660 A | 9/1992 | Hamilton et al. |
| 5,210,051 A | 5/1993 | Carter, Jr. |
| 5,217,600 A | 6/1993 | Le et al. |
| 5,277,840 A | 1/1994 | Osaka et al. |
| 5,338,944 A | 8/1994 | Edmond et al. |
| 5,374,668 A | 12/1994 | Kanemura et al. |
| 5,393,993 A | 2/1995 | Edmond et al. |
| 5,405,251 A | 4/1995 | Sipin |
| 5,416,342 A | 5/1995 | Edmond et al. |
| 5,416,683 A | 5/1995 | McCarthy |
| 5,477,430 A | 12/1995 | Larose |
| 5,523,589 A | 6/1996 | Edmond et al. |
| 5,526,455 A | 6/1996 | Akita et al. |
| 5,535,230 A | 7/1996 | Abe |
| 5,561,346 A | 10/1996 | Byrne |
| 5,575,550 A | 11/1996 | Appeldorn et al. |
| 5,581,683 A | 12/1996 | Bertignoll et al. |
| 5,604,135 A | 2/1997 | Edmond et al. |
| 5,632,551 A | 5/1997 | Roney et al. |
| 5,660,461 A | 8/1997 | Ignatius et al. |
| 5,667,297 A | 9/1997 | Maassen |
| 5,669,486 A | 9/1997 | Shima |
| 5,688,042 A | 11/1997 | Madadi et al. |
| 5,739,554 A | 4/1998 | Edmond et al. |
| 5,753,730 A | 5/1998 | Nagata et al. |
| 5,812,717 A | 9/1998 | Gilliland |
| 5,813,753 A | 9/1998 | Vriens et al. |
| 5,850,126 A | 12/1998 | Kanbar |
| 5,851,063 A | 12/1998 | Doughty et al. |
| 5,858,227 A | 1/1999 | Stone et al. |
| 5,882,553 A | 3/1999 | Prophet et al. |
| 5,899,557 A | 5/1999 | McDermott |
| 5,906,425 A | 5/1999 | Gordin et al. |
| 5,906,429 A | 5/1999 | Mori et al. |
| 5,912,477 A | 6/1999 | Negley |
| 5,931,570 A | 8/1999 | Yamuro |
| 5,956,106 A | 9/1999 | Petersen et al. |
| 5,959,316 A | 9/1999 | Lowery |
| 5,962,971 A | 10/1999 | Chen |
| 5,968,422 A | 10/1999 | Kennedy |
| 6,053,623 A * | 4/2000 | Jones ................ F21V 7/04 362/310 |
| 6,066,861 A | 5/2000 | Hoehn et al. |
| 6,069,440 A | 5/2000 | Shimizu et al. |
| 6,141,034 A | 10/2000 | McCutchen |
| 6,155,699 A | 12/2000 | Miller et al. |
| 6,156,242 A | 12/2000 | Saito et al. |
| 6,177,688 B1 | 1/2001 | Linthicum et al. |
| 6,187,606 B1 | 2/2001 | Edmond et al. |
| 6,204,523 B1 | 3/2001 | Carey et al. |
| 6,218,785 B1 | 4/2001 | Incerti |
| 6,218,790 B1 | 4/2001 | Jansa et al. |
| 6,222,207 B1 | 4/2001 | Carter-Coman et al. |
| 6,227,679 B1 | 5/2001 | Zhang et al. |
| 6,227,683 B1 | 5/2001 | Tukia |
| 6,234,648 B1 | 5/2001 | Boerner et al. |
| 6,252,254 B1 | 6/2001 | Soules et al. |
| 6,270,236 B1 | 8/2001 | Brussog |
| 6,274,890 B1 | 8/2001 | Oshio et al. |
| 6,294,800 B1 | 9/2001 | Duggal et al. |
| 6,305,821 B1 | 10/2001 | Hsieh et al. |
| 6,329,676 B1 | 12/2001 | Takayama et al. |
| 6,335,548 B1 | 1/2002 | Roberts et al. |
| 6,340,824 B1 | 1/2002 | Komoto et al. |
| 6,345,903 B1 | 2/2002 | Koike et al. |
| 6,346,973 B1 | 2/2002 | Shibamoto et al. |
| 6,350,041 B1 | 2/2002 | Tarsa et al. |
| 6,351,069 B1 | 2/2002 | Lowery et al. |

(56) References Cited

U.S. PATENT DOCUMENTS

| | | |
|---|---|---|
| 6,373,188 B1 | 4/2002 | Johnson et al. |
| 6,383,417 B1 | 5/2002 | Paulson et al. |
| 6,391,231 B1 | 5/2002 | Evans et al. |
| 6,404,112 B1 | 6/2002 | Frings et al. |
| 6,404,125 B1 | 6/2002 | Garbuzov et al. |
| 6,404,131 B1 | 6/2002 | Kawano et al. |
| 6,410,940 B1 | 6/2002 | Jiang et al. |
| 6,429,583 B1 | 8/2002 | Levinson et al. |
| 6,465,961 B1 | 10/2002 | Cao |
| 6,472,765 B1 | 10/2002 | Sano et al. |
| 6,495,961 B1 | 12/2002 | Heinrich et al. |
| 6,498,355 B1 | 12/2002 | Harrah et al. |
| 6,504,171 B1 | 1/2003 | Grillot et al. |
| 6,504,301 B1 | 1/2003 | Lowery |
| 6,517,213 B1 | 2/2003 | Fujita et al. |
| 6,521,915 B2 | 2/2003 | Odaki et al. |
| 6,522,065 B1 | 2/2003 | Srivastava et al. |
| 6,536,914 B2 | 3/2003 | Hoelen et al. |
| 6,538,371 B1 | 3/2003 | Duggal et al. |
| 6,541,800 B2 | 4/2003 | Barnett et al. |
| 6,547,416 B2 | 4/2003 | Pashley et al. |
| 6,573,653 B1 | 6/2003 | Ishinaga |
| 6,576,930 B2 | 6/2003 | Reeh et al. |
| 6,578,986 B2 | 6/2003 | Swaris et al. |
| 6,600,175 B1 | 7/2003 | Baretz et al. |
| 6,601,984 B2 | 8/2003 | Yamamoto et al. |
| 6,609,813 B1 | 8/2003 | Showers et al. |
| 6,610,563 B1 | 8/2003 | Waitl et al. |
| 6,614,103 B1 | 9/2003 | Durocher et al. |
| 6,621,211 B1 | 9/2003 | Srivastava et al. |
| 6,626,557 B1 | 9/2003 | Taylor |
| 6,634,770 B2 | 10/2003 | Cao |
| 6,635,987 B1 | 10/2003 | Wojnarowski et al. |
| 6,642,618 B2 | 11/2003 | Yagi et al. |
| 6,657,379 B2 | 12/2003 | Ellens et al. |
| 6,661,167 B2 | 12/2003 | Eliashevich et al. |
| 6,670,748 B2 | 12/2003 | Ellens et al. |
| 6,674,233 B2 | 1/2004 | Ellens et al. |
| 6,680,569 B2 | 1/2004 | Mueller-Mach et al. |
| 6,683,325 B2 | 1/2004 | Waitl et al. |
| 6,685,852 B2 | 2/2004 | Setlur et al. |
| 6,709,132 B2 | 3/2004 | Ishibashi |
| 6,717,353 B1 | 4/2004 | Mueller et al. |
| 6,719,446 B2 | 4/2004 | Cao |
| 6,720,584 B2 | 4/2004 | Hata et al. |
| 6,730,939 B2 | 5/2004 | Eisert et al. |
| 6,734,465 B1 | 5/2004 | Taskar et al. |
| 6,744,077 B2 | 6/2004 | Trottier et al. |
| 6,746,885 B2 | 6/2004 | Cao |
| 6,796,680 B1 | 9/2004 | Showers et al. |
| 6,809,347 B2 | 10/2004 | Tasch et al. |
| 6,812,503 B2 | 11/2004 | Lin et al. |
| 6,814,470 B2 | 11/2004 | Rizkin et al. |
| 6,817,783 B2 | 11/2004 | Lee et al. |
| 6,833,565 B2 | 12/2004 | Su et al. |
| 6,841,804 B1 | 1/2005 | Chen et al. |
| 6,841,933 B2 | 1/2005 | Yamanaka et al. |
| 6,844,903 B2 | 1/2005 | Mueller-Mach et al. |
| 6,864,513 B2 | 3/2005 | Lin et al. |
| 6,871,981 B2 | 3/2005 | Alexanderson et al. |
| 6,917,057 B2 | 7/2005 | Stokes et al. |
| D508,575 S | 8/2005 | Buschmann et al. |
| 6,936,855 B1 | 8/2005 | Harrah |
| 6,936,857 B2 | 8/2005 | Doxsee et al. |
| 6,960,878 B2 | 11/2005 | Sakano et al. |
| 7,005,679 B2 | 2/2006 | Tarsa et al. |
| 7,011,432 B2 | 3/2006 | Chen et al. |
| 7,029,935 B2 | 4/2006 | Negley et al. |
| 7,040,774 B2 | 5/2006 | Beeson et al. |
| 7,055,987 B2 | 6/2006 | Staufert |
| 7,079,367 B1 | 7/2006 | Liljestrand |
| 7,086,756 B2 | 8/2006 | Maxik |
| 7,094,367 B1 | 8/2006 | Harmon et al. |
| D528,227 S | 9/2006 | Chou et al. |
| 7,101,061 B2 | 9/2006 | Nagai et al. |
| D531,741 S | 11/2006 | Takahashi |
| 7,144,131 B2 | 12/2006 | Rains |
| 7,144,140 B2 | 12/2006 | Sun et al. |
| D534,665 S | 1/2007 | Egawa et al. |
| 7,161,311 B2 | 1/2007 | Mueller et al. |
| 7,161,313 B2 | 1/2007 | Piepgras et al. |
| D538,950 S | 3/2007 | Maxik |
| D538,951 S | 3/2007 | Maxik et al. |
| D538,953 S | 3/2007 | Mama |
| 7,196,459 B2 | 3/2007 | Morris |
| D541,440 S | 4/2007 | Feit |
| 7,204,615 B2 | 4/2007 | Arik et al. |
| 7,223,000 B2 | 5/2007 | Yamamura |
| 7,224,001 B2 | 5/2007 | Cao |
| 7,229,196 B2 | 6/2007 | Hulse |
| 7,246,919 B2 | 7/2007 | Porchia et al. |
| 7,252,409 B2 | 8/2007 | Kim |
| 7,258,464 B2 | 8/2007 | Morris et al. |
| 7,273,300 B2 | 9/2007 | Mrakovich |
| D553,267 S | 10/2007 | Yuen |
| 7,284,882 B2 | 10/2007 | Burkholder |
| 7,303,315 B2 | 12/2007 | Ouderkirk et al. |
| 7,304,694 B2 | 12/2007 | Negley et al. |
| D560,286 S | 1/2008 | Maxik et al. |
| 7,314,291 B2 | 1/2008 | Tain et al. |
| 7,352,339 B2 | 4/2008 | Morgan et al. |
| D570,504 S | 6/2008 | Maxik et al. |
| D570,505 S | 6/2008 | Maxik et al. |
| 7,396,146 B2 | 7/2008 | Wang |
| 7,413,325 B2 | 8/2008 | Chen |
| 7,434,964 B1 | 10/2008 | Zheng et al. |
| 7,453,195 B2 | 11/2008 | Radkov et al. |
| 7,479,516 B2 | 1/2009 | Chen et al. |
| 7,479,662 B2 | 1/2009 | Soules et al. |
| 7,494,246 B2 | 2/2009 | Harbers et al. |
| D590,523 S | 4/2009 | Takahashi |
| 7,547,124 B2 | 6/2009 | Chang et al. |
| 7,549,772 B2 | 6/2009 | Wang |
| 7,553,037 B2 | 6/2009 | Sullivan |
| 7,569,425 B2 | 8/2009 | Huang et al. |
| 7,572,033 B2 | 8/2009 | Sun et al. |
| 7,581,856 B2 | 9/2009 | Kang et al. |
| 7,585,090 B2 | 9/2009 | Wu |
| 7,588,351 B2 | 9/2009 | Meyer |
| 7,600,882 B1 | 10/2009 | Morejon et al. |
| 7,614,759 B2 | 11/2009 | Negley |
| 7,636,639 B2 | 12/2009 | Epstein |
| D613,887 S | 4/2010 | Lee et al. |
| D615,220 S | 5/2010 | Crane et al. |
| 7,736,020 B2 | 6/2010 | Baroky et al. |
| 7,748,870 B2 | 7/2010 | Chang et al. |
| 7,758,223 B2 | 7/2010 | Osawa et al. |
| 7,760,499 B1 | 7/2010 | Darbin et al. |
| 7,768,189 B2 | 8/2010 | Radkov |
| 7,784,972 B2 | 8/2010 | Heffington et al. |
| 7,800,909 B2 | 9/2010 | Sun |
| 7,837,363 B2 | 11/2010 | Liu |
| D629,153 S | 12/2010 | Chen |
| 7,932,535 B2 | 4/2011 | Mahalingam et al. |
| 8,030,886 B2 | 10/2011 | Mahalingam et al. |
| 8,035,966 B2 | 10/2011 | Reichenbach et al. |
| 8,057,071 B2 | 11/2011 | He et al. |
| 8,057,075 B2 | 11/2011 | Horng et al. |
| 8,066,410 B2 | 11/2011 | Booth et al. |
| D653,365 S | 1/2012 | Yuan et al. |
| 8,094,393 B2 | 1/2012 | Minano et al. |
| 8,115,395 B2 | 2/2012 | Horng et al. |
| 8,125,126 B2 | 2/2012 | Lin et al. |
| 8,136,576 B2 | 3/2012 | Grimm |
| 8,152,318 B2 | 4/2012 | Richardson |
| D658,788 S | 5/2012 | Dudik et al. |
| D660,991 S | 5/2012 | Allen et al. |
| 8,227,961 B2 | 7/2012 | Van De Ven |
| 8,227,968 B2 | 7/2012 | Kaandorp et al. |
| 8,246,202 B2 | 8/2012 | Mart et al. |
| 8,282,249 B2 | 10/2012 | Liang et al. |
| 8,299,691 B2 | 10/2012 | Grimm |
| 8,314,537 B2 | 11/2012 | Gielen et al. |
| 8,319,408 B1 | 11/2012 | Horng |

(56) References Cited

U.S. PATENT DOCUMENTS

| | | |
|---|---|---|
| 8,324,790 B1 | 12/2012 | Hu |
| 8,390,182 B2 | 3/2013 | Yu |
| 8,414,160 B2 | 4/2013 | Sun et al. |
| 8,541,932 B2 | 9/2013 | Horng |
| 8,562,161 B2 | 10/2013 | Tong et al. |
| 8,602,607 B2 | 12/2013 | Arik et al. |
| 8,608,341 B2 | 12/2013 | Boomgaarden et al. |
| 8,608,347 B2 | 12/2013 | Chinniah et al. |
| 8,616,714 B2 | 12/2013 | Lee et al. |
| 8,845,138 B2 | 9/2014 | Booth et al. |
| 8,882,284 B2 | 11/2014 | Tong et al. |
| 9,523,488 B2 | 12/2016 | Le et al. |
| 2001/0009510 A1 | 7/2001 | Lodhie |
| 2001/0045573 A1 | 11/2001 | Waitl et al. |
| 2002/0043926 A1 | 4/2002 | Takahashi et al. |
| 2002/0063520 A1 | 5/2002 | Yu et al. |
| 2002/0070643 A1 | 6/2002 | Yeh |
| 2002/0079837 A1 | 6/2002 | Okazaki |
| 2002/0080501 A1 | 6/2002 | Kawae et al. |
| 2002/0084745 A1 | 7/2002 | Wang et al. |
| 2002/0084748 A1 | 7/2002 | Ayala et al. |
| 2002/0093820 A1 | 7/2002 | Pederson |
| 2002/0117676 A1 | 8/2002 | Katoh |
| 2002/0123164 A1 | 9/2002 | Slater, Jr. et al. |
| 2002/0163006 A1 | 11/2002 | Yoganandan et al. |
| 2002/0172354 A1 | 11/2002 | Nishi |
| 2002/0196638 A1 | 12/2002 | Stephens et al. |
| 2003/0021117 A1 | 1/2003 | Chan |
| 2003/0039120 A1 | 2/2003 | Cao |
| 2003/0057829 A1 | 3/2003 | Ellens et al. |
| 2003/0067008 A1 | 4/2003 | Srivastava et al. |
| 2003/0067264 A1 | 4/2003 | Takekuma |
| 2003/0090910 A1 | 5/2003 | Chen |
| 2003/0117770 A1 | 6/2003 | Montgomery et al. |
| 2003/0141563 A1 | 7/2003 | Wang |
| 2003/0146690 A1 | 8/2003 | Ellens et al. |
| 2003/0198021 A1 | 10/2003 | Freedman |
| 2003/0210555 A1 | 11/2003 | Cicero et al. |
| 2003/0214616 A1 | 11/2003 | Komoto et al. |
| 2004/0000862 A1 | 1/2004 | Setlur et al. |
| 2004/0000867 A1 | 1/2004 | Chen |
| 2004/0012027 A1 | 1/2004 | Keller et al. |
| 2004/0052077 A1 | 3/2004 | Shih |
| 2004/0056256 A1 | 3/2004 | Bokor et al. |
| 2004/0066142 A1 | 4/2004 | Stimac et al. |
| 2004/0070001 A1 | 4/2004 | Lee et al. |
| 2004/0097635 A1 | 5/2004 | Fan et al. |
| 2004/0136193 A1 | 7/2004 | Liu |
| 2004/0170864 A1 | 9/2004 | Liu |
| 2004/0174651 A1 | 9/2004 | Aisenbrey |
| 2004/0177947 A1 | 9/2004 | Krassowski et al. |
| 2004/0190304 A1 | 9/2004 | Sugimoto et al. |
| 2004/0207998 A1 | 10/2004 | Suehiro et al. |
| 2004/0227149 A1 | 11/2004 | Ibbetson et al. |
| 2004/0228131 A1 | 11/2004 | Minano et al. |
| 2004/0256630 A1 | 12/2004 | Cao |
| 2004/0257797 A1 | 12/2004 | Suehiro et al. |
| 2004/0264197 A1 | 12/2004 | Bewig et al. |
| 2005/0007772 A1 | 1/2005 | Yen |
| 2005/0029927 A1 | 2/2005 | Setlur et al. |
| 2005/0068776 A1 | 3/2005 | Ge |
| 2005/0073244 A1 | 4/2005 | Chou et al. |
| 2005/0093430 A1 | 5/2005 | Ibbetson et al. |
| 2005/0110384 A1 | 5/2005 | Peterson |
| 2005/0116336 A1 | 6/2005 | Chopra et al. |
| 2005/0116597 A1 | 6/2005 | Hsu |
| 2005/0127378 A1 | 6/2005 | Suehiro et al. |
| 2005/0127543 A1 | 6/2005 | Ricking et al. |
| 2005/0174769 A1 | 8/2005 | Yong et al. |
| 2005/0174780 A1 | 8/2005 | Park |
| 2005/0224829 A1 | 10/2005 | Negley et al. |
| 2005/0227388 A1 | 10/2005 | Setlur et al. |
| 2005/0253533 A1 | 11/2005 | Lys et al. |
| 2005/0265035 A1 | 12/2005 | Brass et al. |
| 2006/0005947 A1 | 1/2006 | Arik et al. |
| 2006/0012991 A1 | 1/2006 | Weaver, Jr. et al. |
| 2006/0034077 A1 | 2/2006 | Chang |
| 2006/0050514 A1 | 3/2006 | Opolka |
| 2006/0054915 A1 | 3/2006 | Chang |
| 2006/0066209 A1 | 3/2006 | Chau |
| 2006/0092640 A1 | 5/2006 | Li |
| 2006/0092641 A1 | 5/2006 | Phelan et al. |
| 2006/0098440 A1 | 5/2006 | Allen |
| 2006/0139744 A1 | 6/2006 | Mehrtens et al. |
| 2006/0187653 A1 | 8/2006 | Olsson |
| 2006/0193130 A1 | 8/2006 | Ishibash |
| 2006/0193132 A1 | 8/2006 | Kim et al. |
| 2006/0215422 A1 | 9/2006 | Laizure, Jr. et al. |
| 2006/0232974 A1 | 10/2006 | Lee et al. |
| 2006/0255347 A1 | 11/2006 | Denbaars et al. |
| 2007/0030666 A1 | 2/2007 | Cohen |
| 2007/0132366 A1 | 6/2007 | Yabe et al. |
| 2007/0139798 A1 | 6/2007 | Epstein |
| 2007/0147046 A1 | 6/2007 | Arik et al. |
| 2007/0159091 A1 | 7/2007 | Hirosaki et al. |
| 2007/0159828 A1 | 7/2007 | Wang |
| 2007/0161135 A1 | 7/2007 | Keller et al. |
| 2007/0189010 A1 | 8/2007 | Arai |
| 2007/0235751 A1 | 10/2007 | Radkov et al. |
| 2007/0236912 A1 | 10/2007 | Porchia et al. |
| 2007/0263405 A1 | 11/2007 | Ng et al. |
| 2007/0267976 A1 | 11/2007 | Bohler et al. |
| 2008/0007953 A1 | 1/2008 | Keller et al. |
| 2008/0009187 A1 | 1/2008 | Grimm et al. |
| 2008/0049445 A1 | 2/2008 | Harbers et al. |
| 2008/0062703 A1 | 3/2008 | Cao |
| 2008/0074871 A1 | 3/2008 | Meis et al. |
| 2008/0079017 A1 | 4/2008 | Loh et al. |
| 2008/0080166 A1 | 4/2008 | Duong et al. |
| 2008/0123349 A1 | 5/2008 | Chaves et al. |
| 2008/0130285 A1 | 6/2008 | Negley et al. |
| 2008/0198603 A1 | 8/2008 | Sormani et al. |
| 2008/0213578 A1 | 9/2008 | Endo et al. |
| 2008/0239202 A1 | 10/2008 | Won et al. |
| 2008/0266893 A1 | 10/2008 | Speier |
| 2008/0278955 A1 | 11/2008 | Boyer |
| 2008/0285270 A1 | 11/2008 | Chiang |
| 2008/0307646 A1 | 12/2008 | Zaderej et al. |
| 2008/0318049 A1 | 12/2008 | Hata et al. |
| 2009/0016062 A1 | 1/2009 | Lee et al. |
| 2009/0057699 A1 | 3/2009 | Basin et al. |
| 2009/0059591 A1 | 3/2009 | Nakamura et al. |
| 2009/0084866 A1 | 4/2009 | Grimm et al. |
| 2009/0086478 A1 | 4/2009 | Sanroma et al. |
| 2009/0103293 A1 | 4/2009 | Harbers et al. |
| 2009/0103296 A1 | 4/2009 | Harbers et al. |
| 2009/0129102 A1 | 5/2009 | Xiao et al. |
| 2009/0135595 A1 | 5/2009 | Chen |
| 2009/0148320 A1 | 6/2009 | Lucas |
| 2009/0167192 A1 | 7/2009 | Diederiks et al. |
| 2009/0174302 A1 | 7/2009 | Davey et al. |
| 2009/0195186 A1 | 7/2009 | Guest et al. |
| 2009/0262545 A1 | 10/2009 | Amelung et al. |
| 2009/0267474 A1 | 10/2009 | Zhou et al. |
| 2009/0273925 A1 | 11/2009 | Schultz et al. |
| 2009/0279314 A1 | 11/2009 | Wu et al. |
| 2009/0295265 A1 | 12/2009 | Tabuchi et al. |
| 2009/0296387 A1 | 12/2009 | Reisenauer et al. |
| 2009/0302730 A1 | 12/2009 | Carroll et al. |
| 2009/0303735 A1 | 12/2009 | Chen |
| 2010/0002432 A1 | 1/2010 | Romano |
| 2010/0018686 A1 | 1/2010 | Bontemps et al. |
| 2010/0053963 A1 | 3/2010 | Yang et al. |
| 2010/0072506 A1 | 3/2010 | Bae et al. |
| 2010/0103666 A1 | 4/2010 | Chang et al. |
| 2010/0118495 A1 | 5/2010 | Janssen et al. |
| 2010/0123397 A1 | 5/2010 | Tian et al. |
| 2010/0156325 A1 | 6/2010 | Nelson |
| 2010/0170657 A1 | 7/2010 | Kaslusky |
| 2010/0195335 A1 | 8/2010 | Allen et al. |
| 2010/0207502 A1 | 8/2010 | Cao et al. |
| 2010/0289396 A1 | 11/2010 | Osawa et al. |
| 2011/0018417 A1 | 1/2011 | Lai et al. |
| 2011/0037387 A1 | 2/2011 | Chou et al. |

(56) References Cited

U.S. PATENT DOCUMENTS

| | | |
|---|---|---|
| 2011/0063800 A1 | 3/2011 | Park |
| 2011/0080096 A1 | 4/2011 | Dudik |
| 2011/0080740 A1 | 4/2011 | Allen et al. |
| 2011/0089804 A1 | 4/2011 | Mahalingam et al. |
| 2011/0089830 A1 | 4/2011 | Pickard et al. |
| 2011/0089838 A1 | 4/2011 | Pickard et al. |
| 2011/0095686 A1 | 4/2011 | Falicoff et al. |
| 2011/0121707 A1 | 5/2011 | Fan |
| 2011/0122582 A1 | 5/2011 | Park et al. |
| 2011/0128746 A1 | 6/2011 | Zheng |
| 2011/0140148 A1 | 6/2011 | Liu |
| 2011/0156584 A1 | 6/2011 | Kim |
| 2011/0162823 A1 | 7/2011 | Sharma et al. |
| 2011/0169394 A1 | 7/2011 | Chowdhury et al. |
| 2011/0170299 A1 | 7/2011 | Takase et al. |
| 2011/0204790 A1 | 8/2011 | Arik et al. |
| 2011/0212834 A1 | 9/2011 | Andersch et al. |
| 2011/0215345 A1 | 9/2011 | Tarsa et al. |
| 2011/0215698 A1 | 9/2011 | Tong et al. |
| 2011/0279035 A1 | 11/2011 | Van Dijk et al. |
| 2011/0298355 A1 | 12/2011 | Van De Ven |
| 2012/0002419 A1 | 1/2012 | Zaderej et al. |
| 2012/0008330 A1 | 1/2012 | Horng et al. |
| 2012/0033423 A1* | 2/2012 | Kim .................. F21V 3/00 362/235 |
| 2012/0051058 A1 | 3/2012 | Sharma et al. |
| 2012/0051088 A1* | 3/2012 | Chui .................. G02B 6/0036 362/608 |
| 2012/0080669 A1 | 4/2012 | Yamazaki et al. |
| 2012/0080699 A1 | 4/2012 | Chowdhury et al. |
| 2012/0112615 A1 | 5/2012 | Kuenzler |
| 2012/0140486 A1 | 6/2012 | Chou |
| 2012/0155059 A1 | 6/2012 | Hoelen et al. |
| 2012/0182711 A1 | 7/2012 | Kolodin et al. |
| 2012/0188771 A1 | 7/2012 | Kraus et al. |
| 2012/0194054 A1 | 8/2012 | Johnston et al. |
| 2012/0287652 A1 | 11/2012 | Breidenassel et al. |
| 2012/0300455 A1 | 11/2012 | Breidenassel et al. |
| 2013/0038195 A1 | 2/2013 | Petroski et al. |
| 2013/0057140 A1 | 3/2013 | Falicoff et al. |
| 2013/0058098 A1 | 3/2013 | Kim et al. |
| 2013/0176721 A1 | 7/2013 | Lu et al. |
| 2013/0176722 A1 | 7/2013 | Lay et al. |
| 2013/0194796 A1 | 8/2013 | Progl |
| 2013/0201680 A1 | 8/2013 | Allen et al. |
| 2013/0214666 A1 | 8/2013 | Leung et al. |
| 2013/0214676 A1 | 8/2013 | Li et al. |
| 2013/0294086 A1 | 11/2013 | Mayer et al. |
| 2014/0218892 A1 | 8/2014 | Edwards et al. |
| 2014/0340899 A1 | 11/2014 | Bailey et al. |

FOREIGN PATENT DOCUMENTS

| | | |
|---|---|---|
| CA | 2549822 A1 | 5/2005 |
| CN | 2425428 Y | 3/2001 |
| CN | 1550870 A | 12/2004 |
| CN | 1551339 A | 12/2004 |
| CN | 1561528 A | 1/2005 |
| CN | 2800701 Y | 7/2006 |
| CN | 1811493 A | 8/2006 |
| CN | 1816504 A | 8/2006 |
| CN | 200955687 Y | 10/2007 |
| CN | 101104738 A | 1/2008 |
| CN | 101363610 A | 2/2009 |
| CN | 101517755 A | 8/2009 |
| CN | 201425284 Y | 3/2010 |
| CN | 101828071 A | 9/2010 |
| CN | 202065902 U | 12/2011 |
| DE | 10301169 A1 | 7/2003 |
| DE | 4208172 B4 | 5/2006 |
| DE | 102007037820 A1 | 2/2009 |
| DE | 202009001828 U1 | 7/2009 |
| DE | 202012101158 U1 | 4/2012 |
| EP | 0237104 A1 | 9/1987 |
| EP | 0415640 A2 | 3/1991 |
| EP | 0751339 A2 | 1/1997 |
| EP | 0889967 B1 | 8/1999 |
| EP | 1009017 A2 | 6/2000 |
| EP | 1191608 A2 | 3/2002 |
| EP | 1198016 A2 | 4/2002 |
| EP | 1253373 A2 | 10/2002 |
| EP | 1573870 A2 | 9/2005 |
| EP | 0942474 B1 | 4/2006 |
| EP | 1662197 A2 | 5/2006 |
| EP | 2177812 A1 | 4/2010 |
| EP | 2233832 A1 | 9/2010 |
| EP | 2236917 A1 | 10/2010 |
| EP | 2442009 A1 | 4/2012 |
| GB | 1423011 A | 1/1976 |
| GB | 2195047 A | 3/1988 |
| GB | 2366610 A | 3/2002 |
| GB | 2373846 A | 10/2002 |
| GB | 2405409 A | 3/2005 |
| GB | 2413896 A | 11/2005 |
| GB | 2424123 A | 9/2006 |
| JP | 6210456 U | 1/1987 |
| JP | 62199999 A | 9/1987 |
| JP | 6333879 A | 2/1988 |
| JP | 01233796 A | 9/1989 |
| JP | 04113466 U | 10/1992 |
| JP | 05152609 A | 6/1993 |
| JP | 06151974 A | 5/1994 |
| JP | 06177429 A | 6/1994 |
| JP | 06244458 A | 9/1994 |
| JP | 07193281 A | 7/1995 |
| JP | 08148724 A | 6/1996 |
| JP | 08162676 A | 6/1996 |
| JP | 08330635 A | 12/1996 |
| JP | 09246603 A | 9/1997 |
| JP | 10242513 A | 9/1998 |
| JP | 10282916 A | 10/1998 |
| JP | 11261114 A | 9/1999 |
| JP | 11298047 A | 10/1999 |
| JP | 2000101147 A | 4/2000 |
| JP | 2000101148 A | 4/2000 |
| JP | 2000123620 A | 4/2000 |
| JP | 2000156526 A | 6/2000 |
| JP | 2000164012 A | 6/2000 |
| JP | 2000174347 A | 6/2000 |
| JP | 2000183405 A | 6/2000 |
| JP | 2000208818 A | 7/2000 |
| JP | 2000286455 A | 10/2000 |
| JP | 2000286458 A | 10/2000 |
| JP | 2000304908 A | 11/2000 |
| JP | 2000315822 A | 11/2000 |
| JP | 2000315824 A | 11/2000 |
| JP | 2001035239 A | 2/2001 |
| JP | 2001057445 A | 2/2001 |
| JP | 2001077427 A | 3/2001 |
| JP | 2001077433 A | 3/2001 |
| JP | 2001108773 A | 4/2001 |
| JP | 2001111115 A | 4/2001 |
| JP | 2001144334 A | 5/2001 |
| JP | 2001173239 A | 6/2001 |
| JP | 2001215899 A | 8/2001 |
| JP | 2001218378 A | 8/2001 |
| JP | 2001230453 A | 8/2001 |
| JP | 2001237462 A | 8/2001 |
| JP | 2001243807 A | 9/2001 |
| JP | 2001243809 A | 9/2001 |
| JP | 2001274463 A | 10/2001 |
| JP | 2002118293 A | 4/2002 |
| JP | 2002133925 A | 5/2002 |
| JP | 2002133938 A | 5/2002 |
| JP | 2002141558 A | 5/2002 |
| JP | 2002150821 A | 5/2002 |
| JP | 2002158378 A | 5/2002 |
| JP | 2002223004 A | 8/2002 |
| JP | 2002261328 A | 9/2002 |
| JP | 2002280616 A | 9/2002 |
| JP | 2002304902 A | 10/2002 |
| JP | 2003017755 A | 1/2003 |
| JP | 2003023183 A | 1/2003 |

(56) References Cited

FOREIGN PATENT DOCUMENTS

| JP | 2003037298 A | 2/2003 |
|---|---|---|
| JP | 2003110146 A | 4/2003 |
| JP | 2003110150 A | 4/2003 |
| JP | 2003110151 A | 4/2003 |
| JP | 2003124525 A | 4/2003 |
| JP | 2003206481 A | 7/2003 |
| JP | 2003206482 A | 7/2003 |
| JP | 2003224304 A | 8/2003 |
| JP | 2003249613 A | 9/2003 |
| JP | 2003346526 A | 12/2003 |
| JP | 2004161996 A | 6/2004 |
| JP | 2004185997 A | 7/2004 |
| JP | 2004186109 A | 7/2004 |
| JP | 2004188286 A | 7/2004 |
| JP | 2004207690 A | 7/2004 |
| JP | 2005108700 A | 4/2005 |
| JP | 2005513815 A | 5/2005 |
| JP | 2005166578 A | 6/2005 |
| JP | 2005228855 A | 8/2005 |
| JP | 2006502551 A | 1/2006 |
| JP | 2006310057 A | 11/2006 |
| JP | 2007234462 A | 9/2007 |
| JP | 2008021505 A | 1/2008 |
| JP | 2008200613 A | 9/2008 |
| JP | 2008211060 A | 9/2008 |
| JP | 2008544489 A | 12/2008 |
| JP | 2009016415 A | 1/2009 |
| JP | 2009032466 A | 2/2009 |
| JP | 2009037995 A | 2/2009 |
| JP | 2009038039 A | 2/2009 |
| JP | 2009070732 A | 4/2009 |
| JP | 2009099533 A | 5/2009 |
| JP | 2009170114 A | 7/2009 |
| JP | 2009181838 A | 8/2009 |
| JP | 2010033959 A | 2/2010 |
| JP | 2010504645 A | 2/2010 |
| JP | 2010506366 A | 2/2010 |
| JP | 2010056059 A | 3/2010 |
| JP | 2010073438 A | 4/2010 |
| JP | 2010518593 A | 5/2010 |
| JP | 2011061157 A | 3/2011 |
| JP | 2013524441 A | 6/2013 |
| KR | 100405453 B1 | 11/2003 |
| KR | 100934440 B1 | 12/2009 |
| KR | 20100009909 A | 1/2010 |
| KR | 20110008822 A | 1/2011 |
| KR | 101017349 B1 | 2/2011 |
| KR | 20110117090 A | 10/2011 |
| TW | 457731 B | 10/2001 |
| TW | 200516010 A | 5/2005 |
| WO | 9910867 A1 | 3/1999 |
| WO | 0057490 A1 | 9/2000 |
| WO | 02089175 A1 | 11/2002 |
| WO | 02091489 A2 | 11/2002 |
| WO | 03021623 A1 | 3/2003 |
| WO | 03040026 A2 | 5/2003 |
| WO | 2005028549 A2 | 3/2005 |
| WO | 2005057672 A2 | 6/2005 |
| WO | 2005089293 A2 | 9/2005 |
| WO | 2005102153 A1 | 11/2005 |
| WO | 2005103555 A1 | 11/2005 |
| WO | 2006003604 A1 | 1/2006 |
| WO | 2006011655 A1 | 2/2006 |
| WO | 2006067885 A1 | 6/2006 |
| WO | 2006117447 A1 | 11/2006 |
| WO | 2006129268 A2 | 12/2006 |
| WO | 2006135496 A2 | 12/2006 |
| WO | 2006138397 A2 | 12/2006 |
| WO | 2007130357 A2 | 11/2007 |
| WO | 2008085550 A2 | 7/2008 |
| WO | 2008120165 A1 | 10/2008 |
| WO | 2008134056 A1 | 11/2008 |
| WO | 2009052110 A2 | 4/2009 |
| WO | 2009068471 A1 | 6/2009 |
| WO | 2009071111 A1 | 6/2009 |
| WO | 2009089529 A1 | 7/2009 |
| WO | 20090084372 A1 | 7/2009 |
| WO | 20090115512 A1 | 9/2009 |
| WO | 2009128004 A1 | 10/2009 |
| WO | 2009135359 A1 | 11/2009 |
| WO | 2010038983 A2 | 4/2010 |
| WO | 2010146518 A1 | 12/2010 |
| WO | 2011089069 A2 | 7/2011 |
| WO | 2011089103 A1 | 7/2011 |
| WO | 2011159961 A1 | 12/2011 |
| WO | 2012084674 A1 | 6/2012 |

OTHER PUBLICATIONS

PCT Search Report and Written Opinion dated Jul. 12, 2013 from corresponding PCT Application No. PCT/US2013/037556, 16 pages.
Cree® XLamp® XB-D LED 75-watt Equivalent A19 Lamp Reference Design. 2012. www.Cree.com/XLamp. pp. 1-15.
Jiang et al. "TIR optics enhance the illuminance on target for directional LED modules." LEDs Magazine. Feb. 2012. http://ledsmagazine.com/features.
U.S. Notice of Allowance issued in connection with related U.S. Appl. No. 29/420,071 dated Sep. 14, 2012.
PCT Search Report and Written Opinion issued in connection with related Application No. PCT/US2013/039482 dated Jul. 25, 2013.
PCT Search Report and Written Opinion issued in connection with related Application No. PCT/US2013/039513 dated Jul. 25, 2013.
PCT Search Report and Written Opinion issued in connection with related Application No. PCT/US2013/039464 dated Aug. 1, 2013.
PCT Search Report and Written Opinion issued in connection with related Application No. PCT/US2013/067973 dated Feb. 4, 2014.
U.S. Non-Final Office Action issued in connection with related U.S. Appl. No. 13/665,959 dated Aug. 7, 2014.
U.S. Non-Final Office Action issued in connection with related U.S. Appl. No. 13/710,782 dated Sep. 22, 2014.
U.S. Final Office Action issued in connection with related U.S. Appl. No. 13/665,959 dated Mar. 11, 2015.
U.S. Final Office Action issued in connection with related U.S. Appl. No. 13/665,959 dated May 4, 2015.
U.S. Non-Final Office Action issued in connection with related U.S. Appl. No. 13/665,959 dated Dec. 39, 2015.
European Office Action issued in connection with related Application No. 13719685.3 dated Jan. 18, 2016.
European Office Action issued in connection with related Application No. 13724956.1 dated Jan. 29, 2016.
U.S. Non-Final Office Action issued in connection with related U.S. Appl. No. 14/398,887 dated Sep. 19, 2016.
European Office Action issued in connection with Related EP Application No. 13719685.3 dated Dec. 12, 2016.
Berber et al., "Unusually High Thermal Conductivity of Carbon Nanotubes", Physical Review Letters, vol. No. 84, Issue No. 20, pp. 4613-4616, May 15, 2000.
Cookson Electronics, "Imaging Technologies Update", Enthone Inc, vol. No. 12, pp. 2, Jun. 2002.
Ohno, "Color Rendering and Lumious Efficacy of White LED Spectra", Proceedings, SPIE 5530, Fourth International Conference on Solid State Lighting, Denver, Aug. 3-5, 2004.
Radkov, "High Quality White Light with Near UV LED Chips", 3rd Annual Phophor Global Summit, SanDiego, Mar. 2, 2005.
D5470, "Standard Test Method for Thermal Transmission Properties . . . ," ASTM International, pp. 1-6, 2006.
U.S. Non-Final Office Action issued in connection with related U.S. Appl. No. 10/831,862 dated Mar. 7, 2006.
PCT Search Report and Written Opinion issued in connection with related PCT Application No. PCT/US2005/014043 dated Mar. 21, 2006.
U.S. Final Office Action issued in connection with related U.S. Appl. No. 10/831,862 dated Nov. 1, 2006.
PCT International Preliminary Report on Patentability issued in connection with related PCT Application No. PCT/US2005/014043 dated Nov. 1, 2006.
U.S. Non-Final Office Action issued in connection with related U.S. Appl. No. 11/312,268 dated Feb. 8, 2008.

(56) References Cited

OTHER PUBLICATIONS

PCT Search Report and Written Opinion issued in connection with related PCT Application No. PCT/US2006/047869 dated Jun. 20, 2008.
PCT International Preliminary Report on Patentability issued in connection with related PCT Application No. PCT/US2006/047869 dated Jun. 24, 2008.
U.S. Final Office Action issued in connection with related U.S. Appl. No. 11/312,268 dated Aug. 20, 2008.
Cao Group Inc., "Dynasty Light Redefined", Onesolutio, Sep. 25, 2008.
PCT Search Report and Written Opinion issued in connection with related PCT Application No. PCT/US2007/019425 dated Mar. 6, 2009
PCT International Preliminary Report on Patentability issued in connection with related PCT Application No. PCT/US2007/019425 dated Mar. 10, 2009.
"Philips Lighting unveils 600 lumen dimmable A-shape LED bulb for incandescent replacement", LEDs Magazine, 2 pages, May 5, 2009 retrieved from http://www.ledsmagazine.com/products/18582?cmpid=EnlLEDsMay132009 on Feb. 13, 2017.
U.S. Non-Final Office Action issued in connection with related U.S. Appl. No. 11/516,533 dated May 15, 2009.
US Department of Energy, "Energy Star Program Requirements for Integral LED Lamps", Draft2, at May 19, 2009.
"Sharp Introduces Nine New LED Lamps for Home Use", Sharp, Jun. 11, 2009, retrieved from http://sharp-world.com/corporate/news/090611_2.html on Feb. 13, 2017.
US Department of Energy, "Bright tomorrow lighting competition", Revision1, Jun. 26, 2009.
U.S. Final Office Action issued in connection with related U.S. Appl. No. 11/312,268 dated Aug. 24, 2009.
US Department of Energy, "Energy Star Program Requirements for Integral LED Lamps, Eligibility Criteria", Draft3, Sep. 18, 2009.
Abdullah et al., "Enhancement of Natural Convection Heat Transfer From a Fin by Rectangular Perforations with Aspect Ratio of Two", International Journal of Physical Sciences, vol. No. 04, Issue No. 10, pp. 540-547, Oct. 2009.
U.S. Non-Final Office Action issued in connection with related U.S. Appl. No. 11/516,533 dated Nov. 24, 2009.
OSRAM, "OSRAM LEDs: give your home a bright new look", Dec. 16, 2009.
Australian Examination Report issued in connection with related AU Application No. 2005239406 dated Mar. 18, 2010.
PCT Search Report and Written Opinion issued in connection with related PCT Appication No. PCT/US2010/051109 dated Dec. 1, 2010.
PCT Search Report and Written Opinion issued in connection with related PCT Appication No. PCT/US2010/051043 dated Dec. 27, 2010.
Japanese Office Action issued in connection with related JP Application No. 2007510852 dated Feb. 7, 2011.
Australian Examination Report issued in connection with related AU Application No. 2005239406 dated May 3, 2011.
PCT Search Report and Written Opinion issued in connection with related PCT Application No. PCT/US2011/028970 dated Jun. 14, 2011.
Home Depot product catalog, "EcoSmart 13-Watt (60W) LED A19 Lamp Warm White Light Bulb", pp. 1-3, Jul. 13, 2011.
PCT Search Report and Written Opinion issued in connection with related PCT Application No. PCT/US2011/020744 dated Aug. 10, 2011.
PCT Search Report and Written Opinion issued in connection with related PCT Application No. PCT/US2011/028943 dated Aug. 25, 2011.
PCT Search Report and Written Opinion issued in connection with related PCT Application No. PCT/US2011/028934 dated Aug. 29, 2011.
Australian Examination Report issued in connection with related AU Application No. 2005239406 dated Aug. 31, 2011.
U.S. Restriction requirement issued in connection with corsponding U.S. Appl. No. 29/359,239 dated Sep. 22, 2011.
Japanese Office Action issued in connection with related JP Application No. 2007510852 dated Dec. 12, 2011.
U.S. Non-Final Office Action issued in connection with related U.S. Appl. No. 12/572,480 dated Jan. 12, 2012.
PCT International Preliminary Report on Patentability issued in connection with related PCT Application No. PCT/US2010/051043 dated Apr. 3, 2012.
PCT International Preliminary Report on Patentability issued in connection with related PCT Application No. PCT/US2010/051109 dated Apr. 3, 2012.
U.S. Non-Final Office Action issued in connection with related U.S. Appl. No. 12/979,611 dated Apr. 10, 2012.
U.S. Non-Final Office Action issued in connection with related U.S. Appl. No. 12/572,339 dated Jun. 6, 2012.
U.S. Non-Final Office Action issued in connection with related U.S. Appl. No. 12/884,612 dated Jun. 12, 2012.
U.S. Non-Final Office Action issued in connection with related U.S. Appl. No. 12/884,717 dated Jun. 14, 2012.
PCT International Preliminary Report on Patentability issued in connection with related PCT Application No. PCT/US2011/020744 dated Jul. 26, 2012.
U.S. Final Office Action issued in connection with related U.S. Appl. No. 12/979,611 dated Sep. 12, 2012.
U.S. Non-Final Office Action issued in connection with related U.S. Appl. No. 12/979,476 dated Sep. 17, 2012.
Japanese Before Appeal issued in connection with related JP Application No. 2007510852 on Sep. 21, 2012.
PCT International Preliminary Report on Patentability issued in connection with Corresponding PCT Application No. PCT/US2011/028934 dated Oct. 2, 2012.
PCT International Preliminary Report on Patentability issued in connection with related PCT Application No. PCT/US2011/028970 dated Oct. 2, 2012.
PCT Search Report and Written Opinion issued in connection with related PCT Application No. PCT/US2012/046442 dated Oct. 10, 2012.
U.S. Final Office Action issued in connection with related U.S. Appl. No. 12/884,717 dated Nov. 6, 2012.
U.S. Notice of Allowance issued in connection with related U.S. Appl. No. 12/896,314 dated Dec. 7, 2012.
European Third Party Observation issued in connection with related EP Application No. 10821324.0 dated Dec. 17, 2012.
Final Office Action issued in connection with related U.S. Appl. No. 12/572,339 dated Jan. 11, 2013.
U.S. Non-Final Office Action issued in connection with related U.S. Appl. No. 12/572,480 dated Jan. 14, 2013.
U.S. Non-Final Office Action issued in connection with related U.S. Appl. No. 12/979,529 dated Feb. 7, 2013.
U.S. Non-Final Office Action issued in connection with related U.S. Appl. No. 13/189,052 dated Mar. 5, 2013.
PCT International Preliminary Report on Patentability issued in connection with related PCT Application No. PCT/US2011/028943 dated Apr. 2, 2013.
European Search Report and Opinion issued in connection with related EP Application No. 10821324.0 dated Apr. 8, 2013.
PCT Invitation to pay additional fees issued in connection with related PCT Application No. PCT/US2013/022485 dated May 6, 2013.
U.S. Notice of Allowance issued in connection with related U.S. Appl. No. 12/979,611 dated May 23, 2013.
U.S. Final Office Action issued in connection with related U.S. Appl. No. 12/979,476 dated Jun. 4, 2013.
Final Office Action issued in connection with related U.S. Appl. No. 12/979,529 dated Jun. 13, 2013.
PCT Search Report and Written Opinion issued in connection with related PCT Application No. PCT/US2013/022485 dated Jul. 4, 2013.
U.S. Non-Final Office Action issued in connection with related U.S. Appl. No. 12/572,339 dated Jul. 16, 2013.
U.S. Non-Final Office Action issued in connection with related U.S. Appl. No. 13/366,767 dated Jul. 19, 2013.

(56) References Cited

OTHER PUBLICATIONS

Chinese Office Action issued in connection with related CN Application No. 201080054757.9 dated Aug. 9, 2013.
Chinese Office Action issued in connection with related CN Application No. 201080054756.4 dated Aug. 21, 2013.
U.S. Notice of Allowance issued in connection with related U.S. Appl. No. 12/979,573 dated Oct. 29, 2013.
U.S. Non-Final Office Action issued in connection with related U.S. Appl. No. 12/979,476 dated Nov. 25, 2013.
U.S. Non-Final Office Action issued in connection with related U.S. Appl. No. 13/366,767 dated Jan. 15, 2014.
PCT International Preliminary Report on Patentability issued in connection with related PCT Application No. PCT/US2012/046442 dated Jan. 28, 2014.
European Search Report and Opinion issued in connection with related EP Application No. 05740241.4 dated Feb. 26, 2014.
U.S. Final Office Action issued in connection with related U.S. Appl. No. 12/572,339 dated Mar. 11, 2014.
Chinese Office Action issued in connection with related CN Application No. 201180057758.3 dated Apr. 3, 2014
Chinese Office Action issued in connection with related CN Application No. 201080054757.9 dated Apr. 30, 2014.
Chinese Office Action issued in connection with related CN Application No. 201080054756.4 dated Jun. 10, 2014.
Chinese Office Action issued in connection with related CN Application No. 201180005962.0 dated Jun. 10, 2014.
European Office Action issued in connection with related EP Application No. 05740241.4 dated Jun. 16, 2014.
Chinese Office Action issued in connection with related CN Application No. 201180027211.9 dated Jun. 30, 2014.
U.S. Final Office Action issued in connection with related U.S. Appl. No. 13/366,767 dated Jul. 17, 2014.
Australian Examination Report issued in connection with related AU Application No. 2010300448 dated Jul. 19, 2014.
Australian Examination Report issued in connection with related AU Application No. 2010300489 dated Jul. 21, 2014.
U.S. Final Office Action issued in connection with related U.S. Appl. No. 12/979,476 dated Aug. 14, 2014.
Chinese Office Action issued in connection with corresponding CN Application No. 201180027205.3 dated Sep. 3, 2014.
Australian Examination Report issued in connection with related AU Application No. 2011233568 dated Oct. 22, 2014.
Australian Office Action issued in connection with related AU Application No. 2012287359 dated Oct. 23, 2014.
Australian Office Action issued in connection with related AU Application No. 2011233563 dated Oct. 27, 2014.
Japanese Office Action issued in connection with related JP Application No. 2012548995 dated Oct. 29, 2014.
Australian Examination Report issued in connection with related AU Application No. 2011205461 dated Nov. 3, 2014.
Japanese Office Action issued in connection with related JP Application No. 2013502622 dated Nov. 17, 2014.
Chinese Office Action issued in connection with related CN Application No. 201080054756.4 dated Nov. 26, 2014.
Chinese Office Action issued in connection with related CN Application No. 201180057758.3 dated Nov. 27, 2014.
Japanese Office Action issued in connection with corresponding JP Application No. 2013502627 dated Dec. 8, 2014.
Australian Examination Report issued in connection with related AU Application No. 2010300448 dated Dec. 12, 2014.
European Office Action issued in connection with related EP Application No. 11713110.2 dated Dec. 22, 2014.
Chinese Office Action issued in connection with related CN Application No. 201080054757.9 dated Jan. 6, 2015.
Unofficial English Translation of Chinese Decision on Rejection issued in connection with related CN Application No. 201180027205.3 dated Jan. 22, 2017.
Australian Office Action issued in connection with related AU Application No. 2015246150 dated Feb. 3, 2017.
U.S. Final Office Action issued in connection with related U.S. Appl. No. 13/886,878 dated Feb. 14, 2017.
Unofficial English Translation of Japanese Search Report issued in connection with related JP Application No. 2015212729 dated Feb. 27, 2017.
Australian Notice of Allowance issued in connection with related AU Application No. 2010300489 dated Jan. 7, 2015.
European Office Action issued in connection with related EP Application No. 11713109.4 dated Jan. 30, 2015.
Japanese Office Action issued in connection with related JP Application No. 2013531566 dated Feb. 2, 2015.
U.S. Non-Final Office Action issued in connection with related U.S. Appl. No. 13/366,767 dated Mar. 12, 2015.
U.S. Non-Final Office Action issued in connection with related U.S. Appl. No. 13/886,878 dated Mar. 16, 2015.
Chinese Office Action issued in connection with related CN Application No. 201180027211.9 dated Mar. 23, 2015.
U.S. Notice of Allowance issued in connection with related U.S. Appl. No. 12/572,339 dated Mar. 31, 2015.
U.S. Final Office Action issued in connection with related U.S. Appl. No. 13/710,782 dated Apr. 16, 2015.
Chinese Decision of Rejection issued in connection with related CN Application No. 201180057758.3 dated Apr. 17, 2015.
Chinese Office Action issued in connection with corresponding CN Application No. 201180027205.3 dated May 22, 2015.
U.S. Non-Final Office Action issued in connection with related U.S. Appl. No. 14/079,992 dated May 27, 2015.
Chinese Decision of Rejection issued in connection with related CN Application No. 201080054756.4 dated Jun. 3, 2015.
Australian Office Action issued in connection with related AU Application No. 2011233563 dated Jun. 12, 2015.
Australian Notice of Allowance issued in connection with related AU Application No. 2011205461 dated Jun. 25, 2015.
Japanese Office Action issued in connection with related JP Application No. 2012548995 dated Jun. 29, 2015.
Japanese Office Action issued in connection with corresponding JP Application No. 2013502627 dated Jul. 1, 2015.
Australian Examination Report issued in connection with related AU Application No. 2011233568 dated Jul. 10, 2015.
European Office Action issued in connection with related EP Application No. 11713110.2 dated Jul. 30, 2015.
U.S. Final Office Action issued in connection with related U.S. Appl. No. 13/366,767 dated Aug. 4, 2015.
Chinese Office Action issued in connection with related CN Application No. 201380008205.8 dated Aug. 6, 2015.
Japanese Office Action issued in connection with related JP Application No. 2013502622 dated Aug. 24, 2015.
Unofficial English Translation of Japanese Decision to Grant a Patent issued in connection with related JP Application No. 2013531566 dated Aug. 24, 2015.
Australian Notice of Allowance issued in connection with related AU Application No. 2011233563 dated Sep. 15, 2015.
U.S. Non-Final Office Action issued in connection with related U.S. Appl. No. 14/205,542 dated Sep. 28, 2015.
U.S. Non-Final Office Action issued in connection with related U.S. Appl. No. 14/183,013 dated Oct. 5, 2015.
Australian Examination Report issued in connection with related AU Application No. 2011233568 dated Oct. 14, 2015.
U.S. Final Office Action issued in connection with related U.S. Appl. No. 13/886,878 dated Oct. 29, 2015.
Australian Notice of Allowance issued in connection with related AU Application No. 2011233568 dated Oct. 30, 2015.
Chinese Office Action issued in connection with related CN Application No. 201180057758.3 dated Nov. 12, 2015.
Chinese Office Action issued in connection with related CN Application No. 201180027205.3 dated Dec. 18, 2015.
Japanese Before Appeal issued in connection with related JP Application No. 2012548995 on Feb. 2, 2016.
U.S. Notice of Allowance issued in connection with related U.S. Appl. No. 14/183,013 dated Feb. 12, 2016.
Chinese Notification of Reexamination issued in connection with related CN Application No. 201080054756.4 dated Mar. 3, 2016.

(56) References Cited

OTHER PUBLICATIONS

U.S. Non-Final Office Action issued in connection with related U.S. Appl. No. 14/062,169 dated Mar. 10, 2016.
Australian Examination Report issued in connection with related AU Application No. 2015203255 dated Apr. 1, 2016.
Japanese Office Action issued in connection with related JP Application No. 2013502622 dated May 11, 2016.
U.S. Non-Final Office Action issued in connection with related U.S. Appl. No. 13/886,878 dated May 17, 2016.
U.S. Non-Final Office Action issued in connection with related U.S. Appl. No. 14/205,542 dated May 17, 2016.
Chinese Office Action issued in connection with related CN Application No. 201180057758.3 dated May 30, 2016.
Japanese Office Action issued in connection with corresponding JP Application No. 2013502627 dated Jun. 6, 2016.
Australian Office Action issued in connection with related AU Application No. 2015246150 dated Jun. 14, 2016.
Chinese Office Action issued in connection with related CN Application No. 201180027205.3 dated Jul. 5, 2016.
U.S. Non-Final Office Action issued in connection with related U.S. Appl. No. 14/062,317 dated Aug. 30, 2016.
U.S. Non-Final Office Action issued in connection with related U.S. Appl. No. 14/062,169 dated Sep. 21, 2016.
Japanese Office Action issued in connection with related JP Application No. 2015212729 dated Oct. 17, 2016.
European Office Action issued in connection with related EP Application No. 11708124.0 dated Nov. 11, 2016.
U.S. Notice of Allowance issued in connection with related U.S. Appl. No. 14/205,542 dated Nov. 28, 2016.
European Office Action issued in connection with related EP Application No. 07837797.5 dated Dec. 6, 2016.
Australian Examination Report issued in connection with corresponding AU Application No. 2015246096 dated Dec. 23, 2016.
Mark J. Mayer et al., U.S. Appl. No. 13/706,798, filed Dec. 6, 2012.
Glenn Howard Kuenzler et al., U.S. Appl. No. 14/398,944, filed Nov. 4, 2014.
Glenn Howard Kuenzler et al., U.S. Appl. No. 14/398,887, filed Nov. 4, 2014.
Glenn Howard Kuenzler et al., U.S. Appl. No. 13/665,959, filed Nov. 1, 2012.
Karl Kristian Udris et al., U.S. Appl. No. 13/710,782, filed Dec. 11, 2012.
Ashfaqul I. Chowdhury et al., U.S. Appl. No. 12/979,476, filed Dec. 28, 2010.
Ashfaqul I. Chowdhury et al., U.S. Appl. No. 12/979,573, filed Dec. 28, 2010.
Jeyachandrabose Chinniah et al., U.S. Appl. No. 13/189,052, filed Jul. 22, 2011.
Gary Robert Allen et al., U.S. Appl. No. 13/366,767, filed Feb. 6, 2012.
Ashfaqul Islam Chowdhury et al., U.S. Appl. No. 12/979,611, filed Dec. 28, 2010.
Gary R. Allen et al., U.S. Appl. No. 14/205,542, filed Mar. 12, 2014.
Ashfaqul I. Chowdhury et al., U.S. Appl. No. 12/979,529, filed Dec. 28, 2010.
David C. Dudik et al., U.S. Appl. No. 14/062,317, filed Oct. 24, 2013.
Gary R. Allen et al., U.S. Appl. No. 12/896,314, filed Oct. 1, 2010.
Srinath K. Aanegola et al., U.S. Appl. No. 13/886,878, filed May 3, 2013.
James Reginelli et al., U.S. Appl. No. 11/516,533, filed Sep. 6, 2006.
U.S. Non-Final Office Action issued in connection with related U.S. Appl. No. 13/706,798 dated Jul. 6, 2016.

* cited by examiner

REFLECTOR AND LAMP COMPRISED THEREOF

CROSS-REFERENCE TO RELATED APPLICATIONS

This application is a continuation-in-part of U.S. patent application Ser. No. 13/706,798 filed on Dec. 6, 2012, and entitled "Reflector and Lamp Comprised thereof," which claims the benefit of priority to U.S. Provisional Patent Application Ser. No. 61/643,056, filed on May 4, 2012. The content of these applications is incorporated by reference herein in its entirety.

BACKGROUND

The subject matter of the present disclosure relates to lighting and lighting devices with particular discussion about a lamp with an omni-directional light source, a reflector, and a diffuser, wherein the lamp is configured to generate light at an optical intensity distribution substantially similar to the optical intensity distribution of common incandescent lamps.

Incandescent lamps (e.g., integral incandescent light bulbs and halogen light bulbs) mate with a lamp socket via a threaded base connector (i.e. an "Edison base" in the context of an incandescent light bulb), a bayonet-type base connector (i.e. bayonet base in the context of an incandescent light bulb), or other standard base connector. These incandescent lamps are often in the form of a unitary package that includes components to operate the lamps from a source of standard electrical power (e.g., 110 V and/or 220 V AC and/or 12 VDC and/or DC batteries). In the case of an incandescent lamp, the lamp comprises an incandescent filament operating at high temperature and radiating efficiently excess heat into the ambient. Moreover, the majority of incandescent lamps are naturally omni-directional light sources providing light with a substantially uniform optical intensity distribution (a "intensity distribution").

Energy efficient lighting technologies include solid-state lighting devices such as LEDs, lamps having LEDs as a light source (LED lamp), and other LED-based devices often have performance that is superior to incandescent lamps. The superior performance of a solid-state lighting device can be quantified by its useful lifetime (e.g., its lumen maintenance and its reliability over time) and its higher efficacy as measured in Lumens per Electrical Watt (LPW)). For example, the lifetime of an incandescent lamp is typically in the range of approximately 1,000 to 5,000 hours as compared to the lifetime of LED-based lamps typically exceeding 25,000 hours. In another example, the efficacy of an incandescent lamp is typically in the range of 10 to 30 LPW as opposed to the efficacy of LED-based lamps being typically in the range of 40 to 100 LPW.

LED-based devices do have one disadvantage in some applications; namely, LED-based devices are highly unidirectional by nature. For example, common LED-based devices are flat and usually emit light from only one side of the device. Thus, although superior with respect to certain performance aspects, the intensity distribution of many commercially available LED lamps designed to be suitable alternative and/or replacement for incandescent lamps cannot replicate the intensity distribution of incandescent lamps in satisfactory manner or to a sufficient extent.

Another challenge related to solid-state lighting technologies is the need to find a way to dissipate heat adequately. For example, LED-based devices are highly sensitive to temperature variations with respect to the performance and reliability of the LED-based devices as compared to incandescent lamps containing incandescent or halogen filaments. This temperature sensitivity challenge is often addressed by placing a heat sink in contact with or in thermal contact with the LED-based device. Unfortunately, the heat sink, depending on the placement thereof, may block all or a portion of the light that the LED lamp emits, thus, may limit further the ability of the LED lamp to generate light with a more uniform optical intensity distribution. Moreover, physical constraints on lamps such as regulatory limits that define maximum dimensions for all lamp components, including light sources, limit further an ability to dissipate heat sufficiently and efficiently for LED-based lamps

BRIEF SUMMARY OF THE INVENTION

This disclosure describes embodiments of lamps with favorable features meant to encourage households and commercial establishments to convert from conventional incandescent lamps to more energy efficient lamps (e.g., LED lamps). These embodiments generate light with a uniform optical intensity distribution that is consistent with an incandescent lamp while delivering superior performance with respect to average lifespan of the lamp and to efficacy. Additionally, these embodiments are configured to dissipate heat effectively and efficiently without adversely affecting the uniformity of the optical intensity distribution of the LED lamp.

The disclosure describes, in one embodiment, a lamp with a central axis. The lamp comprises an envelope forming an interior volume, a reflector disposed in the interior volume at a reflector plane that is tangent to at least two points on the reflector, and a light source that is configured to generate light onto the reflector. The reflector and the light source can each have a profile with an outer profile dimension that forms a reflector-to-light source ratio in a range of from about 2.8 to about 3.6. The reflector can be configured in position relative to the light source to form a blocking area that defines a part of said lamp that does not diffuse light, the blocking area configured with an outer boundary that circumscribes the central axis at a maximum outer dimension defined by a blocking angle measured between a first boundary ray and a second boundary ray that extend from a first point at an intersection of the central axis and the reflector plane to, respectively, a second point and a third point disposed on the outer boundary, the blocking angle configured within a range of from about 88° to about 98°.

The disclosure also describes, in one embodiment, a lamp that comprises a reflector having a central axis and a plurality of facets disposed circumferentially about the central axis. The plurality facets are configured to at least partially reflect light. The lamp also comprises a light source spaced apart from the reflector and configured to generate light onto the reflector. The reflector is configured in position relative to the light source to form a blocking area proximate the light source that defines a part of said lamp that does not diffuse light, the blocking area configured with an outer boundary that circumscribes the central axis at a maximum outer dimension defined by a blocking angle measured between a first boundary ray and a second boundary ray that extend from a first point at an intersection of the central axis and the reflector plane to, respectively, a second point and a third point disposed on the outer boundary, the blocking angle configured within a range of from about 88° to about 98°.

The disclosure further describes, in one embodiment, a lamp that comprises a reflector having a central axis and a plurality of facets disposed circumferentially about the central axis. The plurality facets are configured to at least partially reflect light. The lamp also comprises a light source spaced apart from the reflector, the light source comprising a plurality of light-emitting diode (LED) devices that are configured to generate light onto the reflector. The reflector and the light source each have a profile with an outer profile dimension that forms a reflector-to-light source ratio in a range of from about 2.8 to about 3.6.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION

Figure 1:
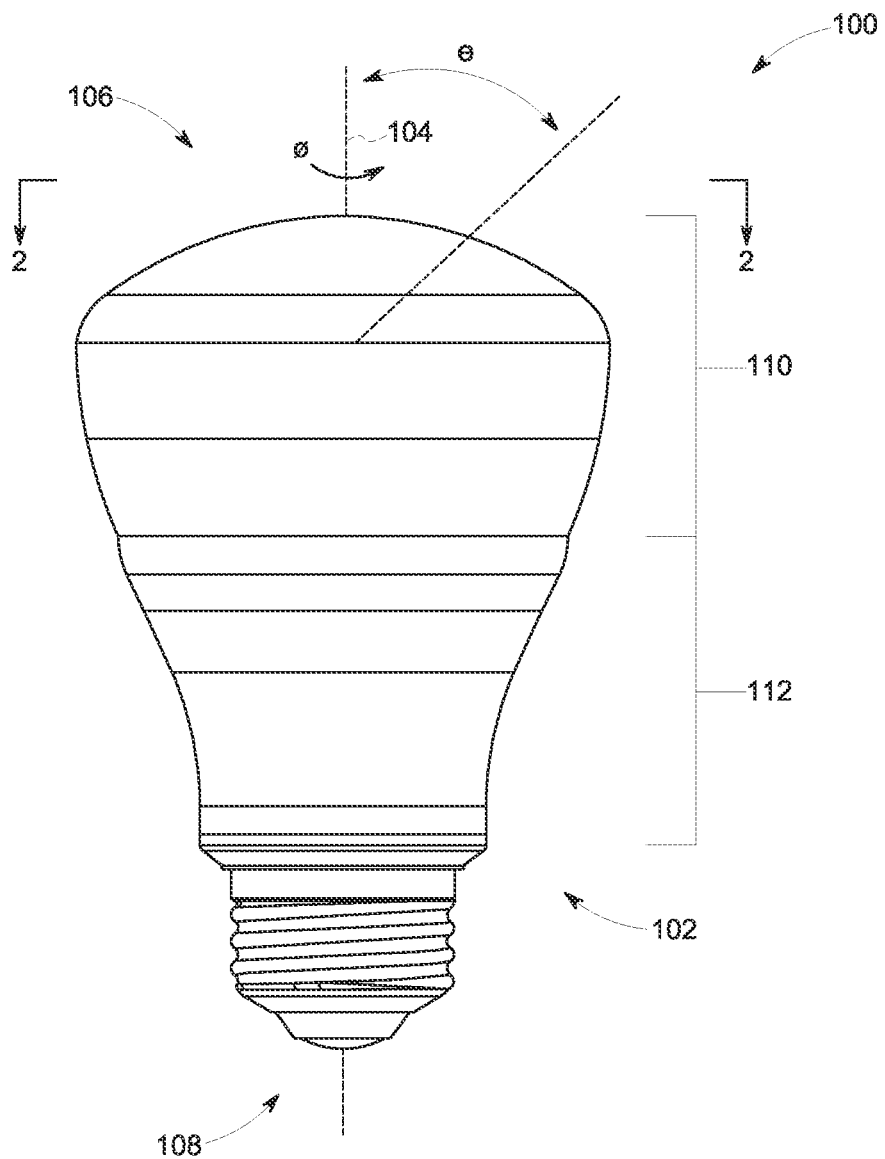
FIG. 1 depicts a front view of an exemplary embodiment of a lamp with a directional light source and a reflector that disperses light from the light source with uniform optical intensity.

FIG. 1 illustrates an exemplary embodiment of a lamp 100 that finds use as a replacement for, e.g., incandescent light bulbs. The lamp 100 comprises a base 102, a central axis 104, an upper pole 106, and a lower pole 108. The lamp 100 also incorporates a light diffusing assembly 110 and a heat dissipating assembly, generally identified by the numeral 112. The poles 106, 108 define a spherical co-ordinate system that is useful to describe the spatial distribution and intensity of illumination that emanates from the lamp 100. The spherical co-ordinate system used in this discussion comprises an elevation or latitude co-ordinate θ and an azimuth or longitudinal co-ordinate Φ. In one example, the elevation or latitude co-ordinate θ shall be defined as being equal to zero degrees (0°) at the upper pole 106 on the central axis 104 and as being equal to one hundred eighty degrees (180°) at the lower pole 108 on the center axis 104.

The lamp 100 can have an operating configuration that influences the relative optical intensity distribution (also "optical intensity") of light. This operating configuration can, for example, prescribe parameters that define relationships between the components of the lamp 100. As discussed more below, these relationships allow the lamp 100 to deploy directional light sources (e.g., light-emitting diode (LED) devices) in combination with the reflector 124 (and the envelope 116) to generate comfortable room lighting, e.g., similar to incandescent A-19 lamps. The parameters also afford the components of the lamp 100 with physical characteristics that are aesthetically pleasing, suitable for manufacture, and that fit within boundaries prescribed by one or more regulatory limits or standards (e.g., ANSI, NEMA, etc.).

The operating configurations for the lamp 100, for example, can achieve profiles for the relative optical intensity distribution that comply with target values for optical intensity that the Department of Energy (DOE) sets for solid-state lighting devices as well as other applicable industry standards and ratings (e.g., ENERGY STAR®). In conventional terms, the profiles that the lamp 100 can achieve is approximately 100±25% over the range of values for the latitudinal co-ordinate θ between zero degrees (0°) and one hundred thirty-five degrees (135°) or greater, where 100% corresponds to the average intensity over the range. In one embodiment, the lamp 100 can maintain the relative optical intensity distribution at 100±25% for values of the latitudinal co-ordinate θ of less than or approximately equal to one hundred forty degrees (140°). The levels and distributions of optical intensity of the lamp 100 render the lamp 100 a suitable replacement for, or alternative to, conventional incandescent light bulbs.

Figure 2:
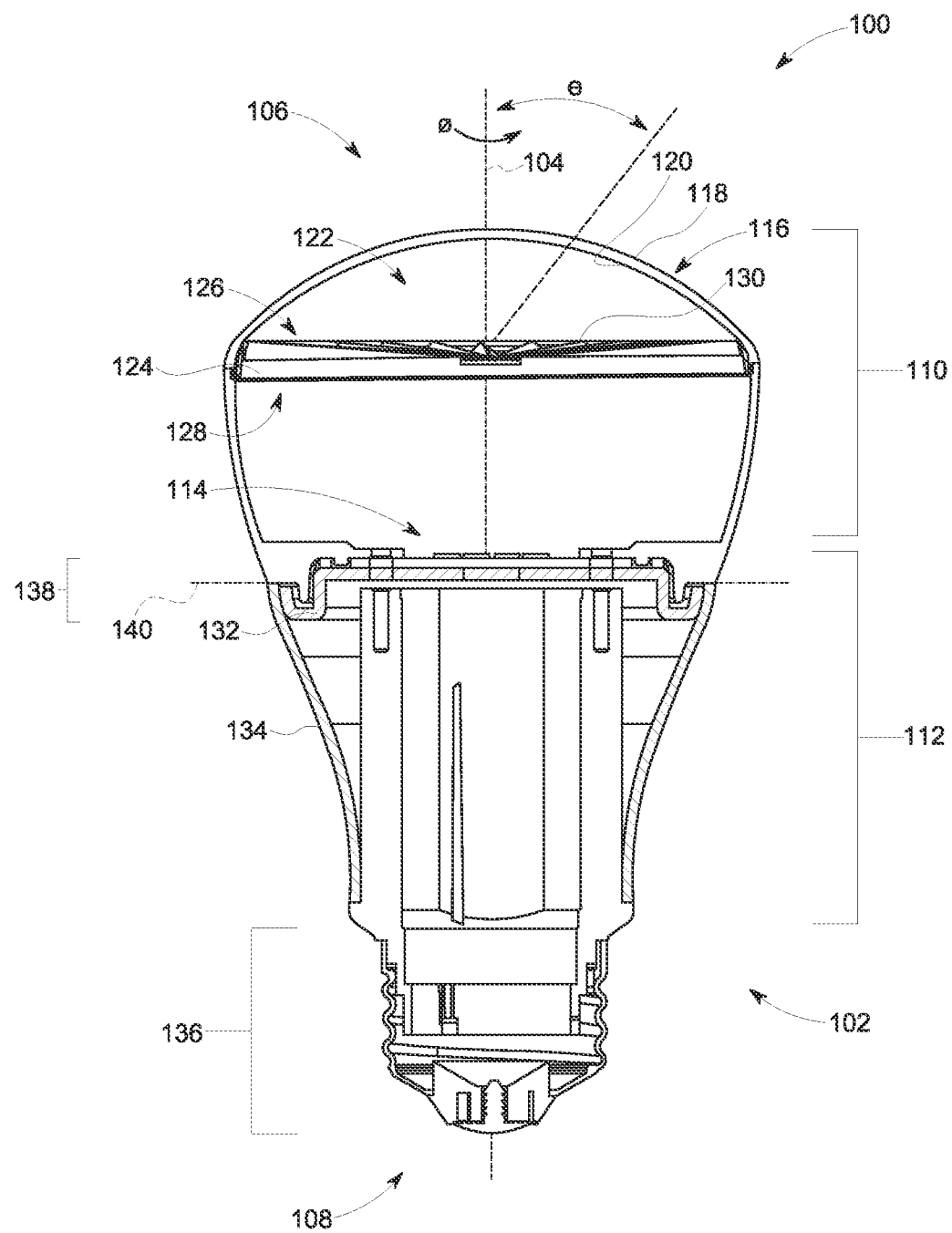
FIG. 2 depicts a cross-section view of the lamp of FIG. 1 taken at line 2-2.

FIG. 2 depicts a cross-section of the lamp 100 taken at line 2-2 of FIG. 1. This figure illustrates one operating configuration that diffuses light in a manner which allows the lamp 100 to operate as a replacement for an ANSI A-19 incandescent lamp. The lamp 100 incorporates a light source 114 that is configured to generate light. The light diffusing assembly 110 includes an envelope 116 with an outer surface 118 and an inner surface 120 that surrounds an interior volume 122. The light diffusing assembly 110 also includes a reflector 124 located within the interior volume 122 of the envelope 116. The reflector 124 has a top 126, a bottom 128, and a plurality of facets 130 disposed circumferentially about the central axis 104. Examples of the facets 130 are configured to at least partially reflect light. The heat dissipating assembly 112 includes a heat sink, which thermally couples with the light source 114. Construction of the heat sink can dissipate heat (or, "thermal energy") away from the light source 114 during operation of the lamp 100. In one example, the heat sink can include a first sink element 132 and a second sink element 134, which in this case can embody part of the base 102. The second heat sink element 134 may embody, and/or incorporate, an outer shell that encloses the heat sink 132 as well as other components (e.g., electrical components). In the present example, this outer shell terminates at a connector region 136 that is configured to mate with a corresponding socket on a lighting fixture. As also shown in FIG. 2, the lamp 100 has a blocking region 138 with a blocking plane 140. Examples of the blocking region 138 identify an area (also "blocking area") of the lamp 100 proximate the light diffusing assembly 110 that does not diffuse light. The parameters for the operating configuration can regulate the size of the blocking area to optimize the relative optical intensity distribution of the lamp 100.

Figure 3:
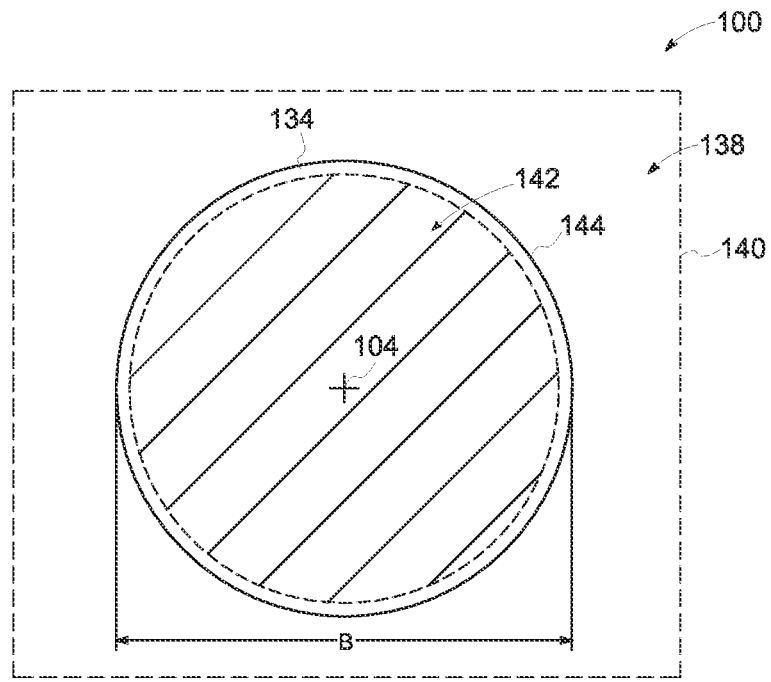
FIG. 3 depicts the lamp of FIG. 1 at a blocking plane proximate the light source.
Figure 4:
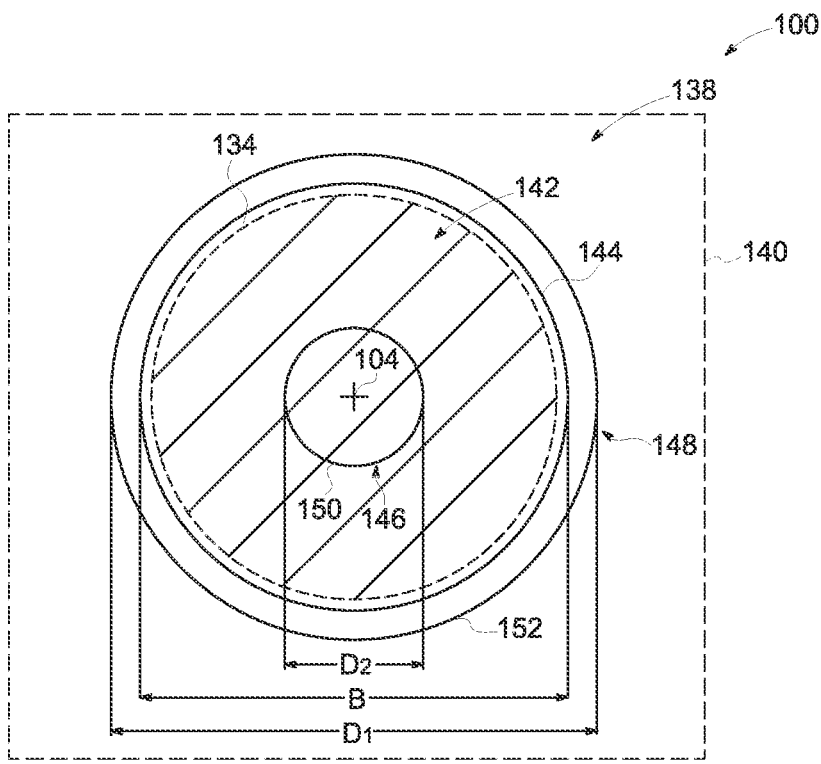
FIG. 4 depicts the lamp of FIG. 3 with the light source and the reflector super-imposed thereon.
Figure 5:
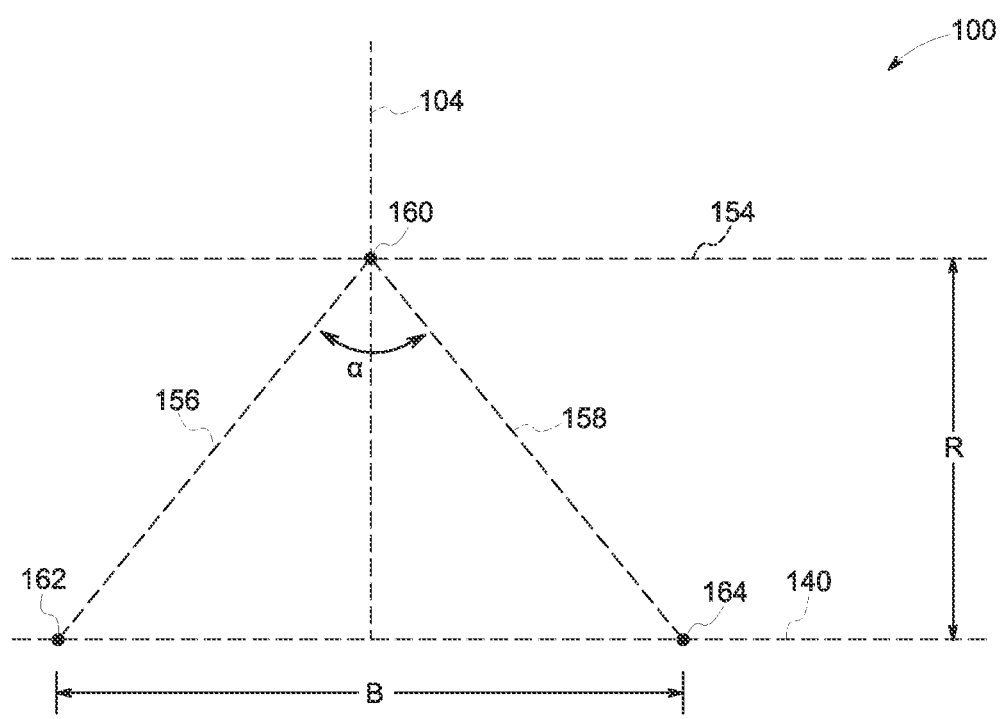
FIG. 5 depicts a side view of the lamp of FIG. 1 with components removed to illustrate one configuration that defines features of the blocking plane.

FIGS. 3, 4, and 5 depict the lamp 100 to illustrate parameters that are useful to describe one example of the operating configuration. FIGS. 3 and 4 provide schematic diagrams of the lamp 100 taken at the blocking plane 140 (FIG. 2). In FIG. 3, the blocking region 138 includes a blocking area profile 142 with an outer boundary 144 that circumscribes the central axis 104. The outer boundary 144 has a boundary dimension B that defines a maximum outer dimension for the blocking area profile 142. For annular shapes, as shown in FIG. 3, the maximum outer dimension corresponds with an outer diameter of the outer boundary 144. In implementations in which the blocking area profile 142 assumes other shapes (e.g., square, rectangular, oval, ellipsoidal, etc.), the maximum outer dimension will correspond to one or more dimensions that define the outer extent of these shapes.

As noted above, the blocking area profile 142 is useful to constrain the size, shape, and/or other features of components of the lamp 100 that do not diffuse light. In one implementation, these components often corresponds with parts of the base 102 (FIG. 2), including the light source, the heat sink, the outer shell, and like components that are likely to interrupt distribution of light from the light diffusing assembly. Parameters for use in the operating configuration can define values for the boundary dimension B, which in turn can define the size of the components of the lamp 100 that are to fit within the confines of the blocking area profile 142.

FIG. 4 super-imposes component profiles (e.g., a first component profile 146 and a second component profile 148) on the blocking area profile 142. As shown in this example, the component profiles 146, 148 have a peripheral boundary (e.g., a first peripheral boundary 150 and a second peripheral boundary 152). The peripheral boundaries 150, 152 circumscribe an area for each of the component profiles 146, 148. The size of this area is defined by a profile dimension (e.g., a first profile dimension D1 and a second profile dimension 12). Values for the profile dimensions D1, D2 represent the approximate size (and/or shape and/or configuration) of, respectively, the reflector 124 and the light source 114.

FIG. 5 illustrates a schematic diagram of a front view of the lamp 100 with certain components removed for clarity. The lamp 100 includes a reflector plane 154 that is spaced apart from the blocking plane 140 by a reflector distance R. The lamp 100 also includes a blocking angle α that forms between a pair of boundary rays (e.g., a first boundary ray 156 and a second boundary ray 158). The boundary angle α defines the relationship between the boundary dimension B and the position of the reflector as defined by the reflector distance R. In one example, the boundary rays 156, 158 originate from an end point 160 at which the central axis 104 intersects the reflector plane 154. The boundary rays 156, 158 also extend to boundary points (e.g., a first boundary point 162 and a second boundary point 164) that are disposed on the outer boundary 144 (FIGS. 3 and 4) of the blocking area profile 142 (FIGS. 3 and 4).

Figure 6:
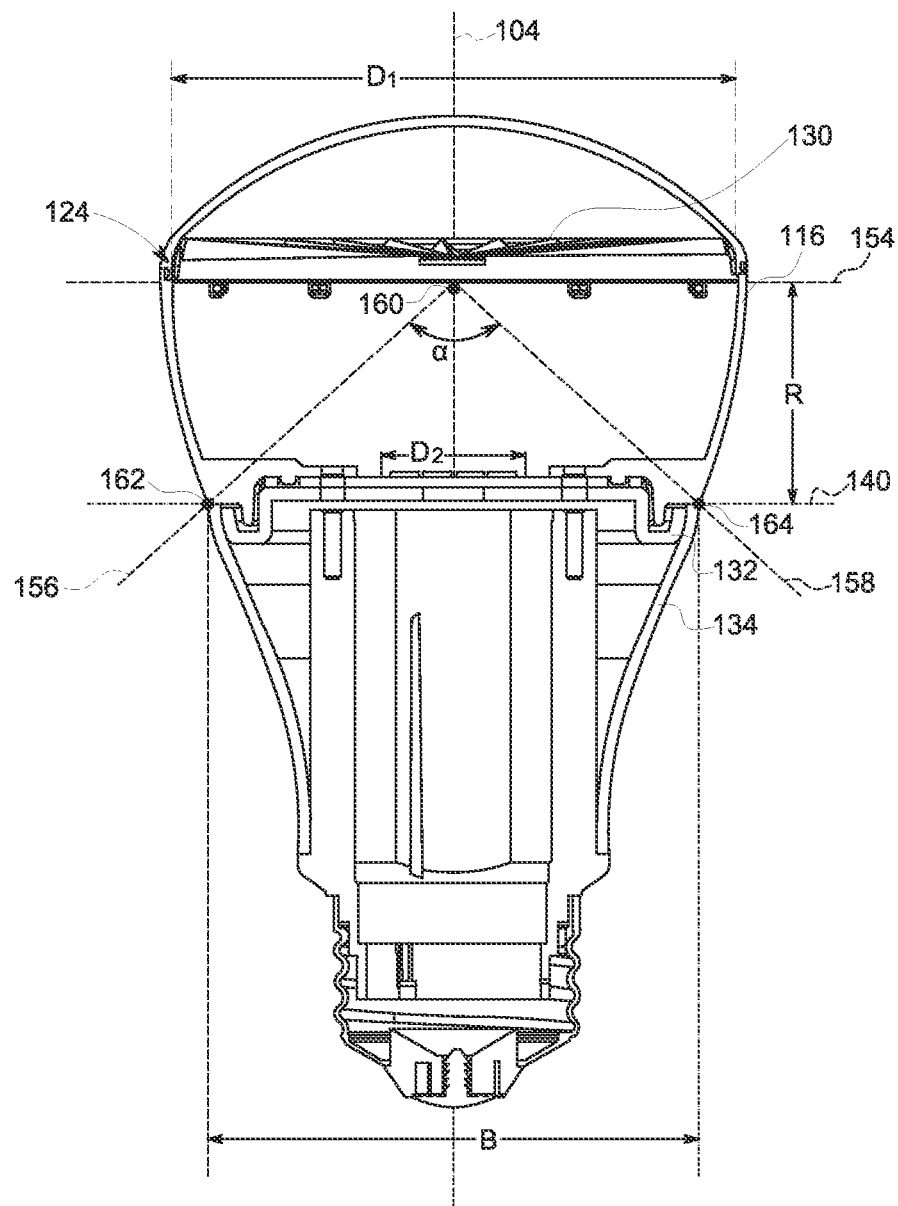
FIG. 6 depicts the cross-section view of FIG. 2 with the configuration of FIG. 5 super-imposed thereon.

FIG. 6 incorporates the diagram of FIG. 5 on the cross-section view of the lamp 100 of FIG. 2 to represent the parameters of the operating configuration. As noted above, these parameters are useful to optimize the optical intensity distribution of light from the lamp. In one example, the blocking plane 140 is tangent to at least two points on the first sink element 132 and/or the second sink element 134. The reflector plane 154 is parallel to the blocking plane 140, residing, in one example, tangent to at least two points on the reflector 124. In one implementation, the operating configuration can utilize various combinations of the parameters to influence the relative optical intensity distribution of the lamp 100. These combinations can, for example, assign values for the first profile dimension D1, the second profile dimension D2, the reflector distance R, and boundary dimension B. In one implementation, the first profile dimension D1 and the second profile dimension D2 assume values that satisfy a reflector-to-source size ratio (e.g., D1:D2) that is greater than about 2.5. In another example, the reflector-to-source ratio is in a range from about 2.5 to about 3.6 and, in one operating configuration, the reflector-to-source ratio is in a range of about 2.8 to about 3.6. In another implementation, the reflector distance D and the boundary dimension B assume values that form the blocking angle α greater than about 78°. In another example, the blocking angle α is in a range from about 78° to about 98° and, in one operating configuration, the blocking angle α is in a range of about 88° to about 98°.

Turning now to discuss other aspects of the proposed design, the facets 130 can have geometry that reflect and/or diffuse light from the light source 114, thus enhancing the characteristics of illumination of the lamp 100. In one example, the facets 130 form and/or reflect light in a manner consistent with a total internal reflection (TIR) lens and similar lossless reflective properties. As a reflector, light from the light source 114 strikes surfaces of the facets 130 at such a steep angle with respect to the normal of the surface (or greater than a so-called critical angle for lens material) that the light cannot pass through the surface and instead reflects off these surfaces as if the surfaces were covered with a material that is reflective.

The envelope 116 can be substantially hollow and have a curvilinear geometry (e.g., spherical, spheroidal, ellipsoidal, toroidal, ovoidal, and/or numerically generated freeform shape) that diffuses light. The outer surface 118 and the inner surface 120 of the envelope 116 can be made from a light-transmissive material. In some examples, the light-transmissive material used to make the envelope 116 is selected from the group comprising glass, acrylic, diffusing polycarbonate, other commercially available diffusing polymers (e.g., Teijin ML5206, MAKROLON®, or any combination thereof. In other examples, the material that the envelope 116 comprises is inherently light-diffusive (e.g., opal glass) or can be made light-diffusive by means of a variety of methods such as frosting and/or texturizing the outer surface 118 and/or the inner surface 120 in order to increase light diffusion. In one example, the envelope 116 comprises a coating (not shown) such as enamel paint and/or other light-diffusive coating. Suitable types of coatings are found on common incandescent and fluorescent light bulbs. In yet another example, manufacturing techniques may be deployed that embed light-scattering particles, fibers, and/or other light scattering media in the material that comprises the envelope 116.

The reflector 124 fits within the interior volume 122 of the envelope 116 in a position to intercept light emitted by the light source 114. As noted herein, this position is spaced apart from the light source 114 and the upper, or top, part of the envelope 116. In one construction, the peripheral edge of the reflector 124 is secured to the inner surface 120 of the envelope 116 with an adhesive or an adhesive material. In other constructions, the inner surface 120 of the envelope 116 and the peripheral edge of the reflector 124 can comprise one or more complimentary mating elements (e.g., a boss and/or a ledge, a tongue and a groove, a snap, etc.). The combination of these complimentary mating elements secures the reflector 124 in position relative to the envelop 116. In another construction, the mating elements may form a snap-fit, a plastic weld joint, or have another mating configuration that prevents the reflector 124 from moving from the position (e.g., as shown in FIG. 1) to any significant extent.

The light source 114 can comprise a planar LED-based light source that emits light into a hemisphere having a Lambertian intensity distribution, compatible with the light diffusing assembly 110 for producing omni-directional illumination distribution. Various configurations for the light source are contemplated for use in connection with the concepts of the present disclosure. These configurations may include, for example, embodiments in which the planar LED-based Lambertian light source includes a plurality of LED devices mounted on a circuit board (not shown), which is optionally a metal core printed circuit board (MCPCB). The LED devices may comprise different types of LEDs. In other embodiments, at least one of a first type of LED may be combined with at least one of a second type of LED, wherein the first and second types of LEDs have respective spectra and intensities that mix with each other in order to render white light of a desired color temperature and color rendering index (CRI). Certain embodiments may assume configurations in which the first type of LED output white light, which in one example has a greenish rendition (achievable, for example, by using a blue or violet emitting LED chip that is coated with a suitable "white" phosphor). The second type of LED output red and/or orange light (achievable, for example, using a GaAsP or AlGaInP or other LED chip that naturally emits red and/or orange light). The light from the first type of LED and from the second type of LED blend together to produce improved color rendition. In another embodiment, the planar LED-based light source can also comprise a single LED or an array of LED emitters incorporated into a single LED device, which may be a white LED device and/or a saturated color LED device and/or so forth. In another embodiment, the LED-based light source can also comprise either a single LED device or an array of LED devices that emit substantially white light which subsequently passes through a selective wavelength filtering element that absorbs or attenuates wavelengths within a prescribed range from the substantially white light emitted by the LED device or devices. This prescribed range of wavelengths for the filtering element can include, for example, wavelengths of less than about 500 nm (i.e., wavelengths corresponding to blue light) or wavelengths between about 570 nm and about 590 nm (i.e., wavelengths corresponding to yellow light). Still other embodiments may utilize configurations in which the LED emitter is an organic LED comprising, in one example, organic compounds that emit light.

Figure 7:
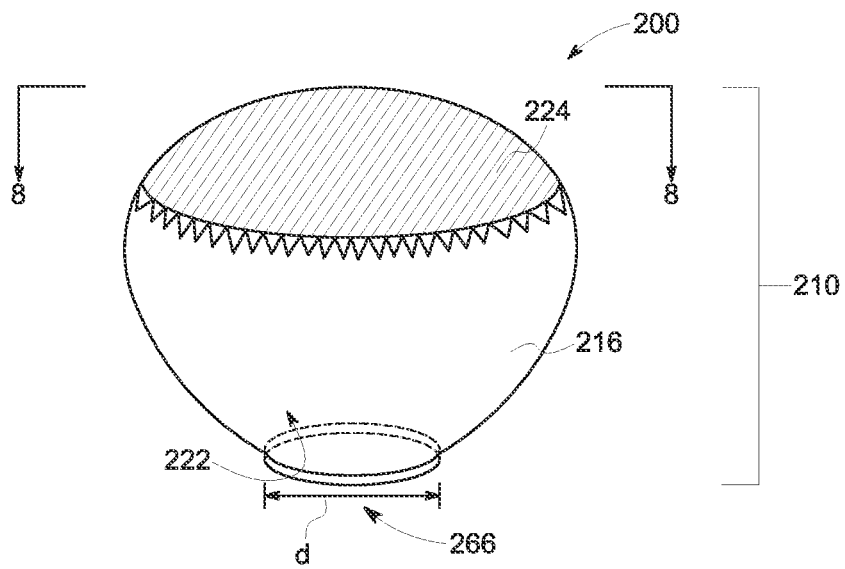
FIG. 7 depicts a perspective view an exemplary light diffusing assembly for use in the lamp of FIGS. 1 and 2.
Figure 8:
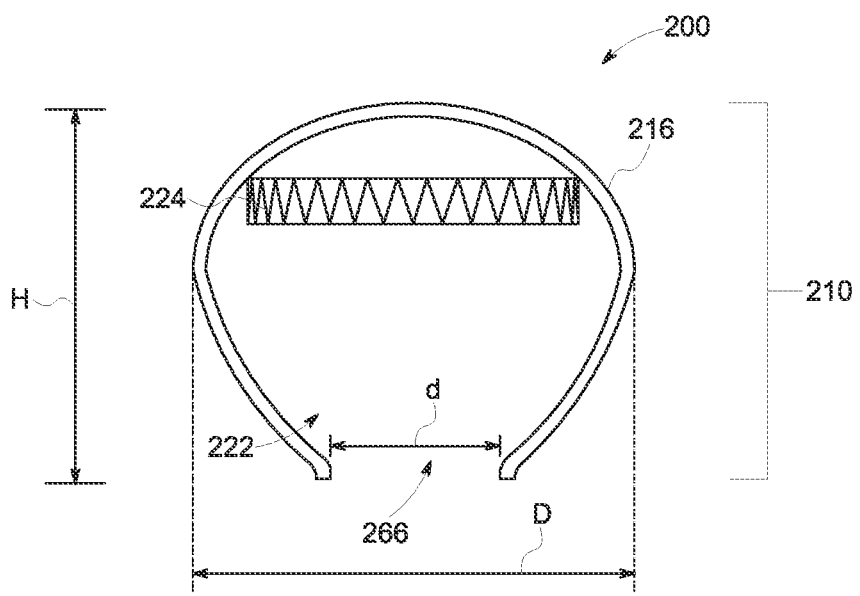
FIG. 8 depicts a side, cross-section view of the exemplary diffuser of FIG. 7.

FIGS. 7 and 8 illustrate embodiments of a lamp 200 with certain parts highlighted for clarity of the discussion below. FIG. 7 shows a perspective view of the lamp 200. FIG. 8 illustrates a side cross-sectional view of the lamp 200 taken along line 8-8 of FIG. 7. In FIG. 7, the light diffusing assembly 210 has optical characteristics that can disperse light to cause the lamp to create the intensity distributions discussed above. The envelope 216 includes an opening 266 that provides access to the interior volume 222 of the envelope 216. The opening 266 has a diameter d that, in one example, is sized and configured to fit about a light source (e.g., light source 14 of FIGS. 1 and 2) when the light diffusing assembly 210 is in position on a lamp (e.g., lamp 100 of FIGS. 1, 2, and 6). In one example, the light diffusing assembly 210 is configured so that the light source sits outside of and/or on the periphery of the majority of the interior volume 222.

Collectively, the configuration of the envelope 216 and the reflector 224 forms one or more active optical areas, which include a transmissive outer area formed by all and/or part of the envelope 216 and a reflective area formed, at least in part, by the reflector 224. In one embodiment, the reflector 224 permits little or no light to pass to the transmissive outer area, e.g., to the top portion of the envelope 216. The reflector 224 may be at least partially coated with a reflective material (e.g., silver foil) in order to further reduce the amount of light that passes through the reflector 224. In one embodiment, the reflector 224 is configured to reflect light so the trajectory of the reflected light has a latitudinal value (e.g., latitudinal value $\theta$ of FIG. 1) in the range of ninety degrees (90°) to one hundred eighty degrees (180°).

In the cross-section of FIG. 8, the light diffusing assembly 210 is shown to have a contour and dimensions (e.g., a height dimension H and an outer diameter D) that define the curvilinear features of the spheroid geometry. The reflector 224 functions to reflect light mostly through the transmissive outer areas of the envelope 216 rather than back to and/or through the opening 266. The diameters (e.g., diameter D and diameter d) along with the optical properties of the envelope 216 that defines the transmissive outer area and the reflector 224 contribute to the intensity distribution of embodiments of the lamps contemplated herein. Examples of the transmissive outer area predominantly allow light to transmit from the interior volume 222 out through the envelope 216. However, the transmissive outer area and the reflector 224 may also exhibit combinations of light-reflecting and/or light-transmitting properties to provide intensity distributions consistent with the look and feel of incandescent light bulbs as well as to meet the various industry standards discussed herein. In one example, the intensity distribution of light through the transmissive outer area is significantly greater than the intensity distribution of light passing through the reflector 224.

Variations in the contour of the envelope 216 can influence the intensity distribution of the light diffusing assembly 210 (e.g., by defining the features of the spheroid geometry in the transmissive outer area). In one example, the spheroid geometry of the light diffusing assembly 210 has a generally flatter shape than a sphere, e.g., having a shape of an oblate spheroid, thus creating the flattened (or substantially flattened) top and peripheral radial curvatures as shown in FIG. 8.

Examples of the envelope 216 of the light diffusing assembly 210 may be formed monolithically as a single unitary construction or as components that are affixed together. Materials, desired optical properties, and other factors (e.g., cost) may dictate the type of construction necessary to form the geometry (e.g., the spheroid geometry) of the light diffusing assembly 210. In another exemplary embodiment, the light diffusing assembly 210 has a multi-component construction in which the spheroid geometry can be approximated by a discrete number of sheet diffusers assembled in an axisymmetric arrangement following the surface of a spheroid. In certain embodiments, sheet diffusers are utilized because the sheet diffusers can exhibit potentially high diffusion of light with relatively low loss or absorption of light compared with monolithically-formed, three-dimensional diffusers. Multi-component structures can exhibit the same optical properties as the diffusive envelope 216 discussed above including the same distribution pattern with similar intensity distribution as discussed in connection with the lamp 100 above. However, multi-component structures may permit complex geometries not necessarily amenable to certain materials and/or processes including monolithic formations of the diffuser as discussed herein.

Figure 9:
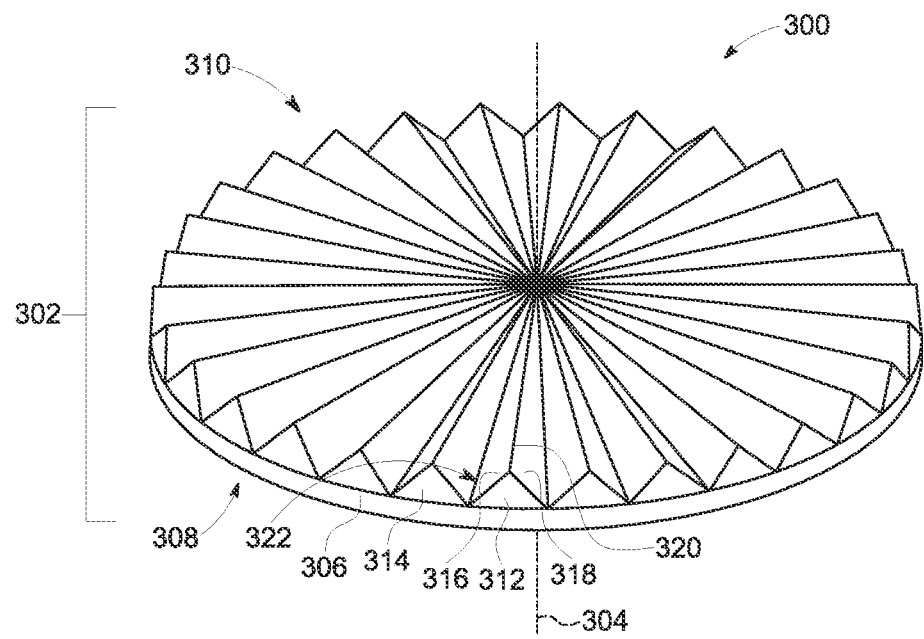
FIG. 9 depicts a perspective view of an exemplary reflector for use in the light diffusing assembly of FIGS. 7 and 8 and the lamps of FIGS. 1 and 2.

FIGS. 9, 10, 11, 12, and 13 illustrate an exemplary reflector 300 suitable for use as the reflectors 124 of FIGS. 2 and 6 and reflector 224 of FIGS. 7 and 8. FIG. 9 depicts a perspective view of the reflector 300. The reflector 300 has a body 302 with a central axis 304 and an outer peripheral edge 306. The body 302 has a first side 308 and a second side 310 that correspond to, respectively, the bottom and the top in the embodiments of FIGS. 1, 2, 3, and 4. The body 302 includes a plurality of facets (e.g., a first facet 312 and a second facet 314) disposed circumferentially about the central axis 304. The facets 312, 314 have an exterior facet profile with a pair of opposing faces (e.g., a first face 316 and a second face 318) that form a facet edge 320 on the second side 310 of the reflector 300. In one embodiment, the first face 316 and the second face 318 of the facets 312, 314 are configured to reflect a first amount of light emitted by the light source back to a first portion of the envelope (e.g., envelope 116, 216 of FIGS. 1 and 2) and to refract a second amount of light emitted by the light source to a second portion of the envelope (e.g., envelope 116, 216 of FIGS. 1 and 2). In one example, the first portion is subjacent (and/or closer to the light source) to the second portion along the optical axis. As also shown in FIG. 9, the faces 316, 318 of adjacent facets 312, 314 can form a valley 322.

Examples of the reflector 300 can be rotationally symmetric, wherein the exterior facet profile and other features are substantially the same for all of the facets (e.g., facets 312, 314) that make up the body 302. In one example, the number of facets (e.g., facets 312, 314) is in the range of about twenty to about forty, although dimensions and other factors (e.g., optical properties) can cause the number of facets 312, 314 to increase and decrease, as desired. As shown in FIG. 9, the facets 312, 314 are generally equally spaced about the central axis 304. However, this disclosure does contemplate other configurations of the reflector 300 in which the distance between adjacent facets 312 (e.g., as measured between the facet edge 320 on adjacent facets 312) varies across the construction of the body 302. In one example, the first side 308 forms a surface that is substantially flat and smooth and, thus, exhibits no or very weak optical power. Moreover, as set forth in some examples below, the construction of the body 302 can incorporate shapes and features that cause the first side 308 and the second side 310 to form convex, concave, and otherwise non-uniform surfaces, e.g., from the outer peripheral edge 306 towards the central axis 304.

The valleys 322 can have various shapes and forms that can influence the optical properties of the reflector 300. In one example, the end of first face 314 and the end of second face 316 meet at a point (or substantially sharp interface) that forms the valley 322 into a "V" shape. In other examples, the valley 322 includes a flat segment and/or radial segment that mates with the end of the first face 314 and the end of the second face 316. This configuration forms the valley 322 with a flat bottom or, in the case of the radial segment, with a "U" shape. The dimensions of the flat segment (and radial segment) can be minimized to achieve an acceptable level of performance and internal reflection from the reflector 300. Likewise, in one embodiment, the exterior facet profile can be rounded along at least a portion of the facet edge 320, wherein such rounding may result from manufacturing, finishing, and/or polishing processes. However, the radii of such rounded peaks should be minimized in order to achieve acceptable performance and internal reflection from the reflector 300.

Figure 10:
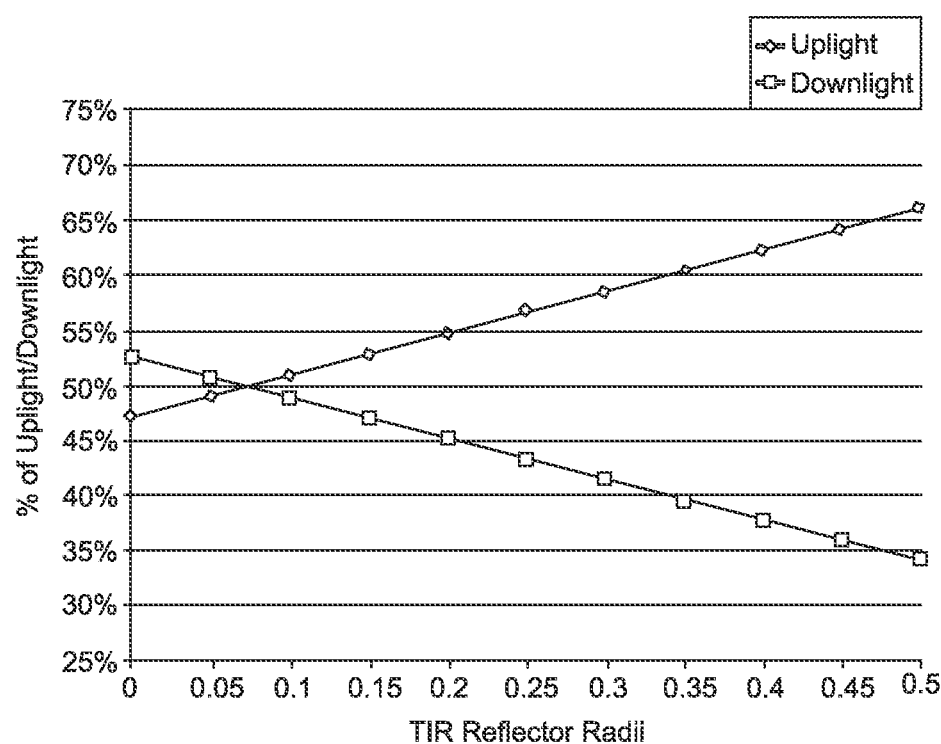
FIG. 10 depicts a plot of data that is useful to identify geometry for use at the edges and valleys on the reflector.

FIG. 10 provides a plot of data that is useful to identify geometry for use at the edges and valleys on the reflector. This plot of data illustrates various configurations of the radii at, for example, the facet edge 320 and the valley edge 322 that will afford the reflector with optical properties to meet certain levels (or percentages) of uplight and downlight. In one implementation, the radii of the facet edge 320 and valley edge 322 are in a range of from about 0.05 mm to about 0.4 mm, as desired. This range can result in configurations for the reflector that allow 63% or less uplight.

Figure 11:
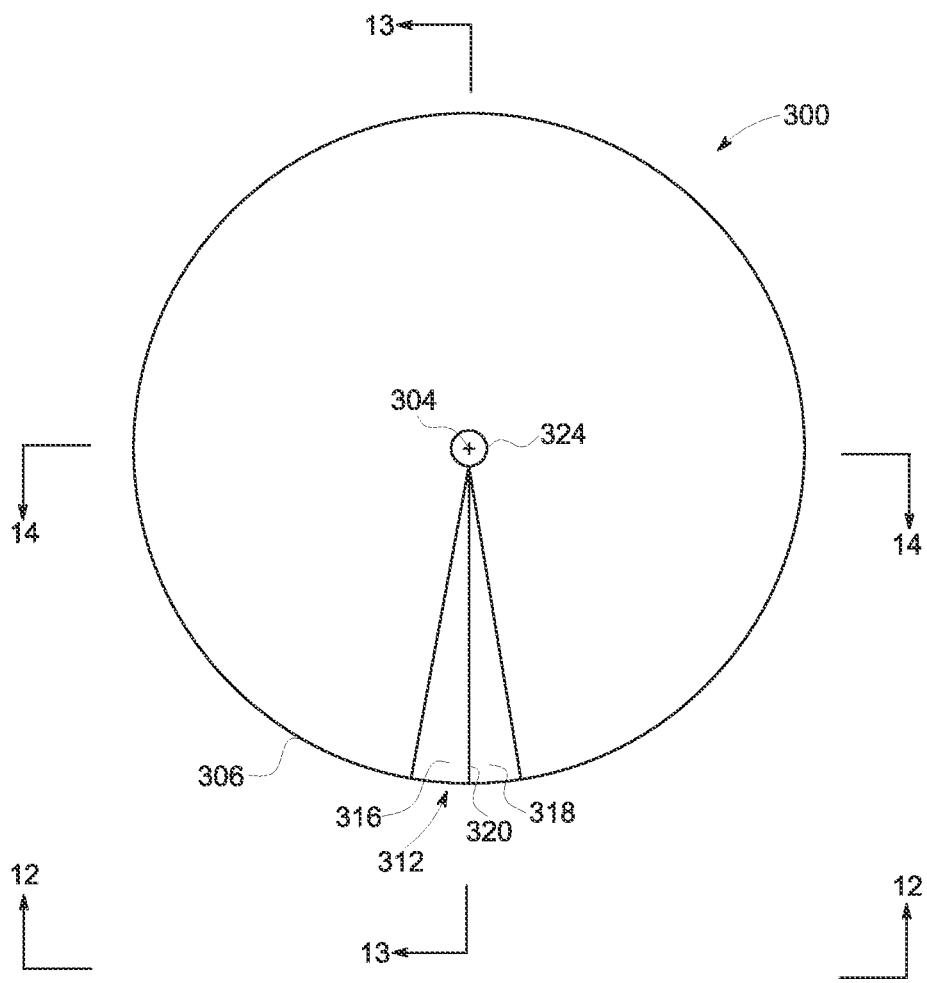
FIG. 11 depicts a top view of a single facet of the reflector of FIG. 9.

FIG. 11 depicts a top view of the reflector 300 with only the facet 312 in view to focus the discussion hereinbelow on one exemplary construction of the facets of the reflector 300. In particular, the example of FIG. 6 illustrates that the facet edge 320 extends from the outer peripheral edge 306 towards the central axis 304. The facet edge 320 terminates at an aperture 324, which is coaxial with the central axis 304 and extends through the body 302. This configuration of the aperture 324 represents an area of the body 302 where material is missing. In some examples, the reflector 300 may include an element that covers all and/or part of the aperture 324. This element may form a dome, flat, or other shape as necessary to promote appropriate optical properties of the reflector 300.

Figure 12:
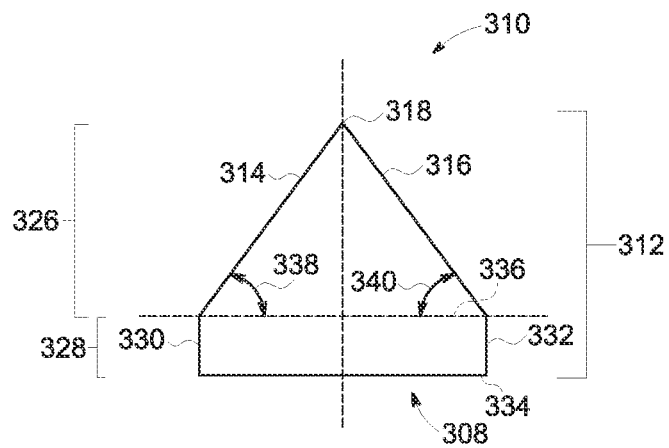
FIG. 12 depicts a front view of the single facet of the reflector taken at line 11-11 in FIG. 10.

As best shown in FIG. 12, which is a front view of the facet 312 of FIG. 11 taken at line 12-12, the exterior facet profile has an upper form factor (e.g., a triangular form factor 326) and a lower form factor (e.g., a rectangular form factor 328). The triangular form factor 326 includes the first face 314, the second face 316, and the facet edge 320. The rectangular form factor 328 includes a pair of parallel sides (e.g., a first parallel side 330 and a second parallel side 332) and a bottom side 334, which in one example is formed by the bottom surface of the reflector 300. The exterior facet profile also includes a mating boundary, shown in phantom lines and generally designated by the numeral 336. The mating boundary 336 defines a geometric plane between the ends of the first face 316 and the second face 318.

In one example, the mating boundary 336 represents the interface between the triangular form factor 326 and the rectangular form factor 328. A first angle 338 and a second angle 340 define the angle created between the mating boundary 336 and the first face 316 and the second face 318, respectively. In one example, the first angle 338 and the second angle 340 are substantially equal. This disclosure also contemplates examples of the exterior facet profile in which the first angle 338 and the second angle 340 have a value in the range of about 45° to about 55°, and in one particular configuration the value is about 50°. In other examples, the first angle 338 is different from (e.g., greater than and/or less than) the second angle 340.

Figure 13:
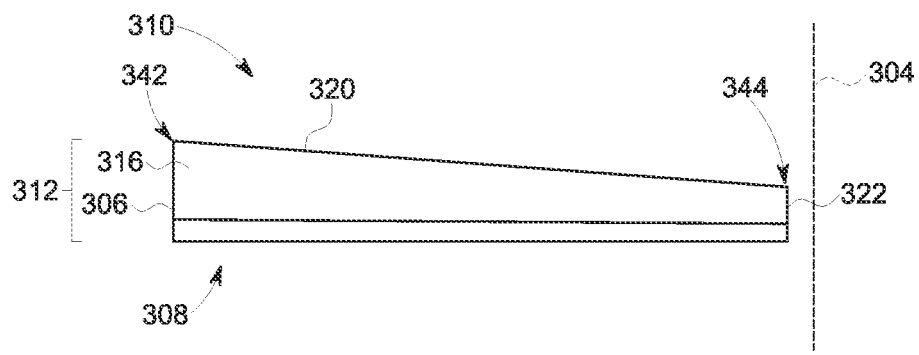
FIG. 13 depicts a side, cross-section view of the single facet of the reflector taken at line 13-13 in FIG. 11 that illustrates one configuration of the exterior profile of the facet.
Figure 14:
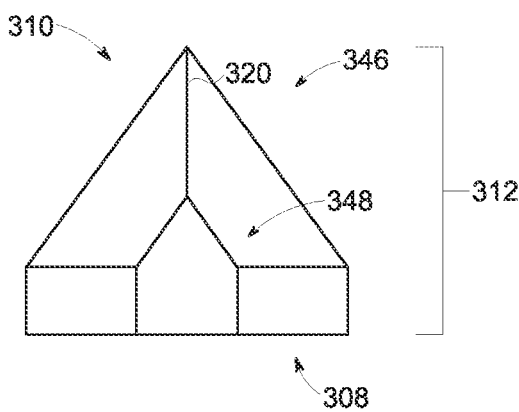
FIG. 14 depicts a cross-section view of reflector taken at line 14-14 in FIG. 11 that illustrates a first profile and a second profile of the exterior profile of the single facet.

FIGS. 13 and 14 show views of the facet 312 taken at, respectively, line 13-13 and line 14-14 of FIG. 11. In the example of FIG. 13, which is a side, cross-section view, the facet 312 has a first end 342, proximate the outer peripheral edge 306, and a second end 344 proximate the aperture 322. The facet edge 320 has a slope which changes from the first end 342 to the second end 344. The extent and/or degree to which the facet edge 320 slopes depends, in one example, on the change in the exterior facet profile from the first end 342 to the second end 344. The outer exterior profile of the facet 312 can remain constant, i.e., the first angle 338 and the second angle 340 in FIG. 12 have the same value from the first end 342 to the second end 344. In other examples, and as best shown in FIG. 14, the facet 312 can have a first exterior facet profile 346 (also, "first profile 346") and a second exterior facet profile 348 (also "second profile 348"), wherein the ratio of the lengths of first profile 346 to the second profile 348 controls the degree of slope of the facet edge 320. The ratio can have a value in the range of about 1 to about 3, although this disclosure contemplates other configurations in which the ratio falls outside of this range. Modifications in the ratio can change the height of the facet 312 across the facet edge 320 from the first end 342 to the second end 344. In FIG. 14, for example, the first profile 346 is dimensionally larger than the second profile 348. This configuration causes the facet edge 320 to slope or grade downwardly (e.g., in a direction from the first side 308 toward the second side 310) as the facet edge approaches the center axis 304. In other examples, the first profile 346 is dimensionally smaller than the second profile 348, thus causing the facet edge 320 to slope or grade upwardly (e.g., in a direction from the first side 308 toward the second side 310).

As set forth above, the reflector 300 can exhibit optical properties that are similar to TIR lenses that do not require any secondary processing such the application of a reflective coating, treatment, or layer to any of the surfaces of the reflector 300. In one embodiment, the reflector 300 consists of a single unitary piece in order to facilitate ease of manufacture and to help reduce costs and expenses related to the manufacture of the reflector 300. In another embodiment, a reflective coating or layer (e.g., silver foil or metallic paint) may be selectively applied to the top surfaces of the reflector 300, e.g., along the edge 320 of the facets 312 and/or the central aperture 324. This reflective coating can reduce the amount of light emitted from a light source (e.g., the light source 114 of FIGS. 2 and 6) that passes through the reflector 300 and continues subsequently through the upper portion of a lamp (e.g., the lamp 100, 200 (FIGS. 1, 2, 6, 7, and 8) and/or of a light diffusing assembly (e.g., light diffusing assembly 110, 210 of FIGS. 2, 6, 7, and 8).

The following examples further illustrate alternate configurations and designs for reflectors 124 of FIGS. 2 and 6, reflector 224 of FIGS. 7 and 8, and reflector 300 of FIGS. 9, 10, 11, 12, 13, and 14.

EXAMPLES

Figure 15:
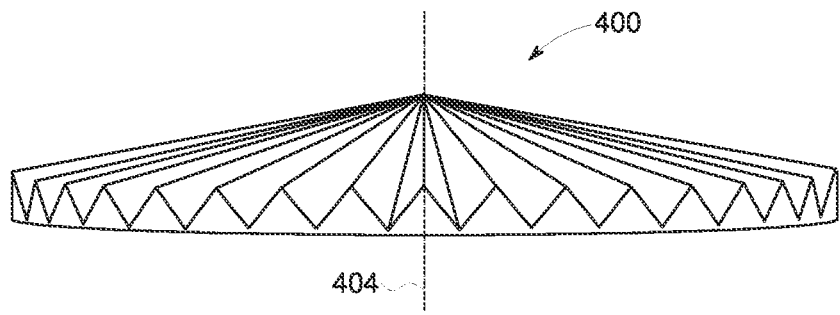
FIG. 15 depicts an exemplary reflector for use in the light diffusing assembly of FIGS. 7 and 8 and the lamps of FIGS. 1 and 2 that has an upward conical shape.
Figure 16:
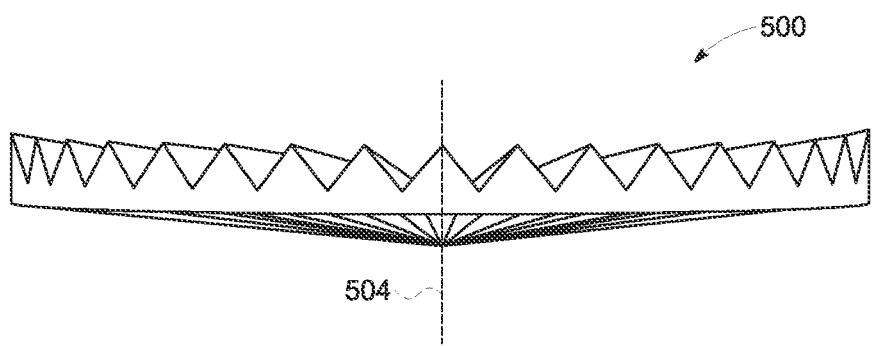
FIG. 16 depicts an exemplary reflector for use in the light diffusing assembly of FIGS. 7 and 8 and the lamps of FIGS. 1 and 2 that has a downward conical shape.
Figure 17:
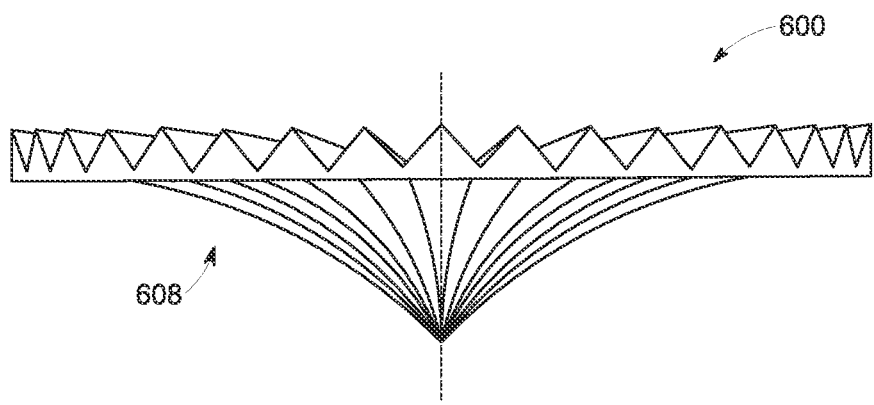
FIG. 17 depicts an exemplary reflector for use in the light diffusing assembly of FIGS. 7 and 8 and the lamps of FIGS. 1 and 2 that has a conical shape with curved and/or curvilinear features.

FIGS. 15, 16, 17, and 18 illustrate various form factors and constructions for embodiments of reflectors this disclosure contemplates herein. Examples of reflector 400 and 500 of FIGS. 15 and 16 having a conical reflector shape. In FIG. 15, the reflector 400 has an upward conical shape that may result when the center point of the outer profile (e.g., outer profile 346 of FIG. 14) is offset, or moved downwardly, along the axis 404 relative to the inner profile (e.g., inner profile 348 of FIG. 13). The reflector 500 of FIG. 16 has a downward conical shape that may result when the center point of the outer profile (e.g., outer profile 346 of FIG. 14) is offset, or moved upwardly, along the axis 504 relative to the inner profile (e.g., inner profile 348 of FIG. 13). FIG. 17 illustrates another configuration for the reflector 600 in which the surface at the bottom 608 of the reflector 600 can form a conical shape with curved and/or curvilinear features.

Figure 18:
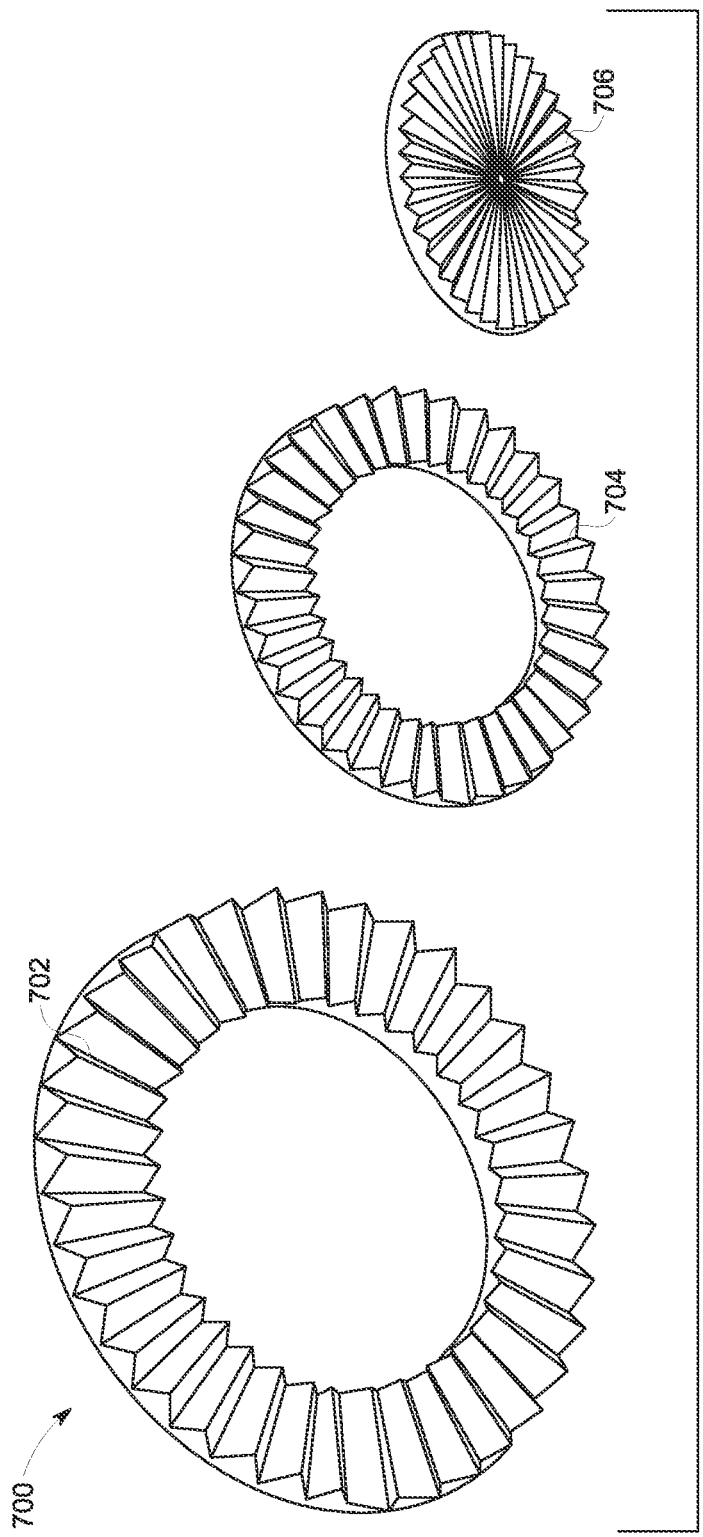
FIG. 18 depicts a perspective view of an exploded assembly of an exemplary reflector for use in the light diffusing assembly of FIGS. 7 and 8 and the lamps of FIGS. 1 and 2 that has multiple-piece construction.

FIG. 18 depicts an exploded view of an exemplary construction of a reflector 700. This construction utilizes multiple pieces (e.g., a first piece 702, a second piece 704, and a third piece 706) to form the facets of the reflector 700. These multiple pieces can form one or more annular rings (e.g., the first piece 702 and the second piece 704) and an inner disc (e.g., the third piece 706). In one example, each of the pieces 702, 704, 706 include facets that conform to the features disclosed herein. In one embodiment, assembly of the pieces 702, 704, 706 together complete the structure of the reflector 700 and, accordingly, form the facets that are useful to manipulate light as required for use in the lamps.

Figure 19:
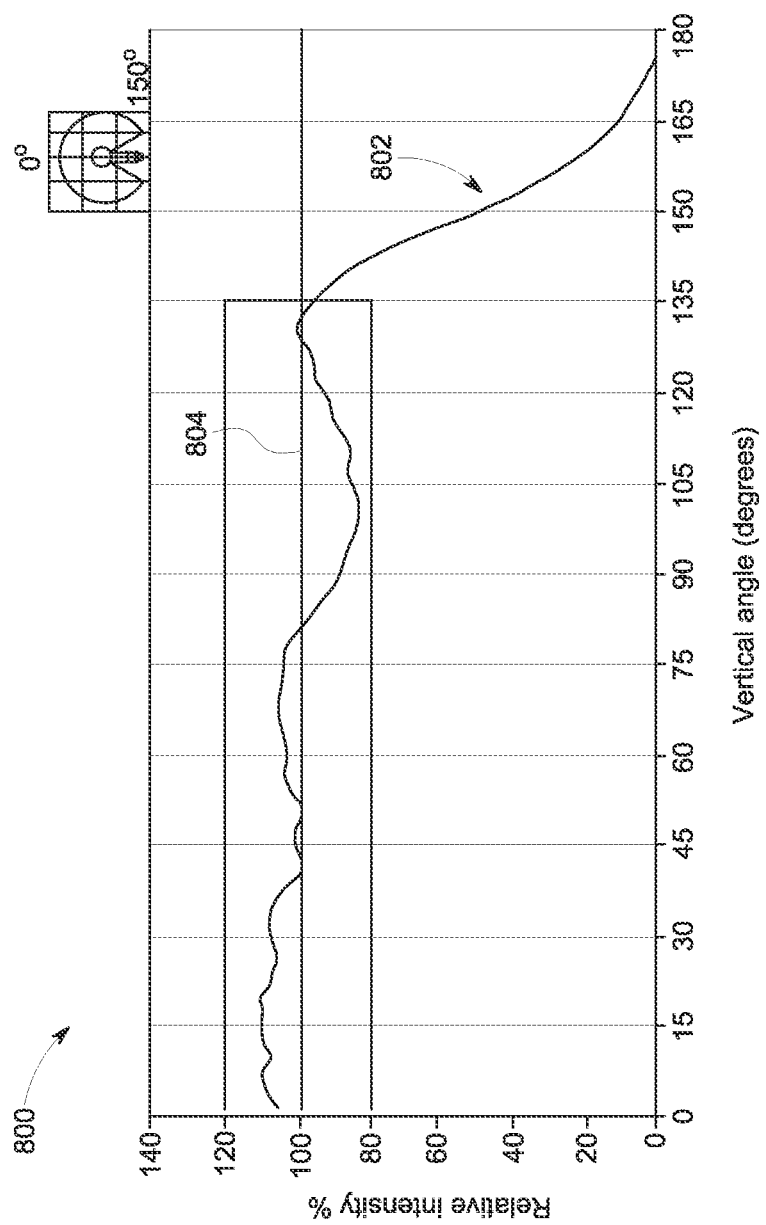
FIG. 19 depicts a plot of an optical intensity distribution profile for an embodiment of a lamp such as the lamps of FIGS. 1 and 2.

FIG. 19 illustrates a plot 800 of an optical intensity distribution profile 802. Data for the plot 800 was gathered using from an embodiment of the lamp having a reflector substantially similar to the reflector shown in FIGS. 5, 6, 7, 8, and 9 and described above. As the optical intensity profile 802 illustrates, the lamp achieves a mean optical intensity 804 of approximately 100±25% at a latitudinal co-ordinate up to at least one hundred thirty-five degrees (135°).

As used herein, an element or function recited in the singular and preceded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lamp with a central axis, comprising:
an envelope forming an interior volume;

a reflector disposed in the interior volume at a reflector plane that is tangent to at least two points on the reflector, wherein the reflector comprises a plurality of facets disposed circumferentially about the central axis, wherein the facets are configured to at least partially reflect light from the light source; and a light source that is configured to generate light onto the reflector, wherein the reflector and the light source each have a profile with an outer profile diameter that forms a reflector-to-light source size ratio in a range of from about 2.8 to about 3.6;

wherein, the envelope is configured to diffuse light from the light source with an intensity distribution of a level of approximately 100±25% over a range of values for a latitudinal co-ordinate θ between zero degrees (0°) and one hundred thirty-five degrees (135°) or greater.

2. The lamp of claim 1, further comprising a heat sink with a first sink element in thermal contact with the light source.

3. The lamp of claim 1, wherein the envelope has an outer surface that is configured to fit within a lamp profile defined by ANSI standards for an A-19 lamp.

4. The lamp of claim 1, wherein the facets have an exterior facet profile with a first face, a second face opposing the first face at an angle, and a facet edge disposed therebetween.

5. The lamp of claim 4, wherein the reflector has an outer peripheral edge, and wherein the facet edge tapers from the outer peripheral edge toward the central axis.

6. The lamp of claim 1, wherein the reflector forms an internal reflection lens.

7. A lamp, comprising:

a reflector having a central axis and a plurality of facets disposed circumferentially about the central axis, wherein the plurality of facets are configured to at least partially reflect light, wherein the facets have an exterior facet profile with a first face, a second face opposing the first face at an angle, and a facet edge disposed therebetween, wherein adjacent facets in the plurality of facets form a valley edge; and a light source spaced apart from the reflector, the light source comprising a plurality of light-emitting diode (LED) devices that are configured to generate light onto the reflector, wherein the reflector and the light source each have a profile with an outer profile diameter that forms a reflector-to-light source ratio in a range of from about 2.5 to about 3.6.

8. The lamp of claim 7, further comprising a base with a heat sink comprising a first sink element in thermal contact with the light source, wherein the envelop is configured to diffuse light from the light source with an intensity distribution of a level of approximately 100±25% over a range of values for a latitudinal co-ordinate θ between zero degrees (0°) and one hundred thirty-five degrees (135°) or greater.

9. The lamp of claim 7, wherein the facet edge and the valley edge form, respectively, a first radius and a second radius that is the same as the first radius.

10. The lamp of claim 7, wherein the reflector forms an internal reflection lens.

11. A lamp with a central axis, comprising:

an envelope forming an interior volume;

a reflector disposed in the interior volume at a reflector plane that is tangent to at least two points on the reflector, wherein the reflector comprises a plurality of facets disposed circumferentially about the central axis, wherein the facets are configured to at least partially reflect light from the light source; and a light source that is configured to generate light onto the reflector, wherein the reflector and the light source each have a profile with an outer profile diameter that forms a reflector-to-light source size ratio in a range of from about 2.8 to about 3.6;

wherein the lamp further comprises a heat sink with a first sink element in thermal contact with the light source.

* * * * *